(12) United States Patent
Goossens et al.

(10) Patent No.: US 10,750,162 B2
(45) Date of Patent: Aug. 18, 2020

(54) SWITCHABLE VIRTUAL REALITY HEADSET AND AUGMENTED REALITY DEVICE

(71) Applicant: GOOGLE LLC, Mountain View, CA (US)

(72) Inventors: Erik Hubert Dolly Goossens, San Francisco, CA (US); Joost Korngold, Sunnyvale, CA (US); Xavier Benavides Palos, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 42 days.

(21) Appl. No.: 16/128,264

(22) Filed: Sep. 11, 2018

(65) Prior Publication Data

US 2019/0082169 A1 Mar. 14, 2019

Related U.S. Application Data

(60) Provisional application No. 62/556,860, filed on Sep. 11, 2017.

(51) Int. Cl.
*H04N 13/00* (2018.01)
*H04N 13/359* (2018.01)
(Continued)

(52) U.S. Cl.
CPC ....... *H04N 13/359* (2018.05); *G02B 27/0172* (2013.01); *G02B 27/0176* (2013.01);
(Continued)

(58) Field of Classification Search
CPC ... H04N 13/359; H04N 13/332; H04N 13/344
(Continued)

(56) References Cited

U.S. PATENT DOCUMENTS

| 4,253,732 A | 3/1981 | Carver |
| 4,478,498 A | 10/1984 | Ohno |

(Continued)

FOREIGN PATENT DOCUMENTS

| CN | 2544300 Y | * | 4/2003 |
| CN | 2544300 Y | | 4/2003 |

(Continued)

OTHER PUBLICATIONS

"PConline original I DIY a cottage version of Google Glass for only 17 yuan", https://pcedu.pconline.com.cn/555/5553536.html, with English Translation, Oct. 11, 2014, 19 pages.

(Continued)

*Primary Examiner* — Jeffrey A Williams
(74) *Attorney, Agent, or Firm* — Brake Hughes Bellermann LLP

(57) ABSTRACT

Systems, devices, and apparatuses for a switchable augmented reality and virtual reality device are provided. An example device includes a handle, a device chamber, a viewport assembly, and a hinge assembly. The handle may be formed from folded sheets of material. The example device chamber is coupled to the handle and formed from folded sheets of material. The viewport assembly may be formed at least in part from folded sheets of material. The example hinge assembly pivotably couples the device chamber to the viewport assembly. For example, the hinge assembly may be operable to adjust the device between a virtual reality configuration and an augmented reality configuration. A display of a computing device held in the device chamber may be viewable through the viewport assembly in the virtual reality configuration and the display may be viewable without the viewport assembly in the augmented reality configuration.

21 Claims, 23 Drawing Sheets

(51) Int. Cl.
G06F 1/16 (2006.01)
G02B 27/01 (2006.01)
G06F 3/01 (2006.01)
G02B 30/37 (2020.01)
H04N 13/332 (2018.01)
H04N 13/361 (2018.01)
H04N 13/398 (2018.01)
G06T 19/00 (2011.01)

(52) U.S. Cl.
CPC ......... *G02B 27/0179* (2013.01); *G02B 30/37* (2020.01); *G06F 1/163* (2013.01); *G06F 3/011* (2013.01); *H04N 13/332* (2018.05); *H04N 13/361* (2018.05); *H04N 13/398* (2018.05); *G02B 2027/0134* (2013.01); *G02B 2027/0154* (2013.01); *G02B 2027/0156* (2013.01); *G02B 2027/0161* (2013.01); *G06T 19/006* (2013.01); *H04N 2213/001* (2013.01)

(58) Field of Classification Search
USPC ........................................................ 348/158
See application file for complete search history.

(56) References Cited

U.S. PATENT DOCUMENTS

| | | |
|---|---|---|
| 4,773,747 A | 9/1988 | Bresnahan |
| 4,846,553 A | 7/1989 | Rice |
| 5,344,065 A | 9/1994 | Moran |
| D374,002 S | 9/1996 | Bassett et al. |
| D415,146 S | 10/1999 | Hori |
| 6,046,727 A | 4/2000 | Rosenberg et al. |
| D427,982 S | 7/2000 | Ishii |
| D440,967 S | 4/2001 | Jung |
| D444,155 S | 6/2001 | Morooka et al. |
| D503,188 S | 3/2005 | Lin |
| D578,120 S | 10/2008 | Lowe et al. |
| D592,398 S | 5/2009 | Roesler |
| D601,641 S | 10/2009 | Yeung |
| D612,152 S | 3/2010 | Roesler |
| D663,524 S | 7/2012 | Penttinen |
| 8,303,123 B2 | 11/2012 | Kory |
| D687,300 S | 8/2013 | Jones et al. |
| D687,434 S | 8/2013 | Serota |
| D689,618 S | 9/2013 | Valderrama et al. |
| 8,577,427 B2 | 11/2013 | Serota |
| D700,160 S | 2/2014 | Fisher et al. |
| D701,206 S | 3/2014 | Luckey et al. |
| 8,686,959 B2 | 4/2014 | Payne |
| D704,704 S | 5/2014 | Tatara et al. |
| D719,953 S | 12/2014 | Nokuo et al. |
| 8,908,015 B2 | 12/2014 | Filo et al. |
| 8,957,835 B2 | 2/2015 | Hoellwarth |
| D727,318 S | 4/2015 | Garcia Marin et al. |
| D732,028 S | 6/2015 | Kim et al. |
| D738,374 S | 9/2015 | Luckey et al. |
| D739,855 S | 9/2015 | Bosveld et al. |
| D740,810 S | 10/2015 | Bosveld et al. |
| D740,814 S | 10/2015 | Bosveld et al. |
| D741,323 S | 10/2015 | Bosveld et al. |
| D741,327 S | 10/2015 | Reznik |
| 9,176,325 B2 | 11/2015 | Lyons |
| D745,517 S | 12/2015 | Kumagai |
| D749,583 S | 2/2016 | Luckey et al. |
| D750,074 S | 2/2016 | Coz et al. |
| D751,072 S | 3/2016 | Lyons |
| 9,298,283 B1 | 3/2016 | Lin et al. |
| D753,111 S | 4/2016 | Fei et al. |
| D755,789 S | 5/2016 | Lyons |
| D756,571 S | 5/2016 | Colvin |
| D757,003 S | 5/2016 | Goossens et al. |
| D759,654 S | 6/2016 | Sullivan et al. |
| 9,405,126 B1 | 8/2016 | Margolin |
| D765,658 S | 9/2016 | Spio |
| D766,896 S | 9/2016 | Li et al. |
| D776,111 S | 1/2017 | Baldassi et al. |
| D781,854 S | 3/2017 | Park et al. |
| D781,944 S | 3/2017 | Lee |
| D784,441 S | 4/2017 | Garfias |
| D791,854 S | 7/2017 | Bates et al. |
| D792,398 S | 7/2017 | Costa et al. |
| D794,700 S | 8/2017 | Li |
| D796,507 S | 9/2017 | Chen et al. |
| D800,114 S | 10/2017 | Woo et al. |
| 9,804,393 B1 * | 10/2017 | Coz ................ G02B 27/0176 |
| D801,969 S | 11/2017 | Yee et al. |
| D804,298 S | 12/2017 | Demmink |
| D805,617 S | 12/2017 | Mcconnell |
| D806,073 S | 12/2017 | Li et al. |
| 9,857,595 B2 | 1/2018 | Costa et al. |
| 9,869,874 B2 | 1/2018 | Zhang |
| D812,127 S | 3/2018 | Seo et al. |
| D815,637 S | 4/2018 | Li |
| 10,139,637 B2 | 11/2018 | Costa et al. |
| D835,102 S | 12/2018 | Raffle et al. |
| 10,209,769 B2 | 2/2019 | Goosens et al. |
| 2009/0046141 A1 | 2/2009 | Nojiri et al. |
| 2010/0079356 A1 | 4/2010 | Hoellwarth |
| 2010/0277575 A1 | 11/2010 | Ismael et al. |
| 2013/0082963 A1 | 4/2013 | Chu |
| 2013/0147721 A1 | 6/2013 | Mcgeever et al. |
| 2014/0152531 A1 | 6/2014 | Murray et al. |
| 2014/0176608 A1 | 6/2014 | Boysen et al. |
| 2014/0247246 A1 | 9/2014 | Maus |
| 2014/0267637 A1 | 9/2014 | Hoberman et al. |
| 2015/0111624 A1 | 4/2015 | Peel |
| 2015/0138645 A1 | 5/2015 | Yoo et al. |
| 2015/0215608 A1 | 7/2015 | Tahara |
| 2015/0234189 A1 | 8/2015 | Lyons |
| 2015/0253574 A1 | 9/2015 | Thurber |
| 2016/0018853 A1 | 1/2016 | Buckley |
| 2016/0025990 A1 | 1/2016 | Zhang |
| 2016/0062454 A1 | 3/2016 | Wang et al. |
| 2016/0180591 A1 | 6/2016 | Shiu et al. |
| 2016/0203642 A1 | 7/2016 | Thomas |
| 2016/0232715 A1 | 8/2016 | Lee |
| 2016/0349836 A1 * | 12/2016 | Goossens ............... G02B 27/22 |
| 2017/0108703 A1 | 4/2017 | Kong |
| 2017/0199388 A1 | 7/2017 | Vinzant |

FOREIGN PATENT DOCUMENTS

| | | |
|---|---|---|
| CN | 104216118 A | 12/2014 |
| CN | 104276347 A | 1/2015 |
| CN | 204188882 U | 3/2015 |
| CN | 104718495 A | 6/2015 |
| DE | 9103786 U1 | 5/1991 |
| EP | 0708350 A1 | 4/1996 |
| EP | 2942305 A1 | 11/2015 |
| ES | 1115455 U | 7/2014 |
| GB | 2472255 A | 2/2011 |
| GB | 2516242 A | 1/2015 |
| GB | 2534538 A | 8/2016 |
| JP | H06189227 A | 7/1994 |
| JP | 2007-075300 A | 3/2007 |
| JP | 3176588 U | 6/2012 |
| KR | 20140013676 A | 2/2014 |
| KR | 20150059085 A | 5/2015 |
| KR | 101530788 B1 | 6/2015 |
| TW | M505467 U | 7/2015 |
| WO | 2012/035174 A1 | 3/2012 |
| WO | 2014/108693 A1 | 7/2014 |
| WO | 2014/057557 A1 | 8/2016 |
| WO | 2014/103006 A1 | 1/2017 |

OTHER PUBLICATIONS

Dodocase, "Virtual Reality Cardboard Toolkit", available online at <https://web.archive.org/web/20150208221833/http://www.dodose.com/products/google-cardboard-vr-goggle-toolkit>, Feb. 8, 2015, 7 pages.

(56) References Cited

OTHER PUBLICATIONS

Knox Labs, "Classic Cardboard VR Kit Assembly", available online at <https://www.youtube.com/watch?v=zRu00cTX6hs>, Dec. 19, 2014, 3 pages.
"Google Cardboard", available online at <www.goggle.com/cardboard>, retrieved on May 12, 2015, 3 pages.
"Multipart Plan", Github, available online at <https://github.com/VR4ALL/cardboard.goggles/blob/master/goggle_2.8_ok.svg>, dated Feb. 26, 2014, 1 page.
"Photo 1" posted to Instagram by inventor on Oct. 6, 2013, 1 page.
"Photo 2" posted to Instagram by inventor on Oct. 6, 2013, 1 page.
"Photo 3" posted to Instagram by inventor on Oct. 6, 2013, 1 page.
Brewster, Signe, "Why Google Cardboard is Actually a Huge Boost for Virtual Reality", available online at <https://gigaom.com/2014/06/28/why-google-cardboard-is-actually-a-huge-boost-for-virtual-reality/>, Jun. 28, 2014, 7 pages.
Dodocase, "DODOcase Virtual Reality Kit 1.2 Assembly Instruction Video YouTube", available online at <https://www.youtube.com/watch?v=ze1528521Yw>, retrieved on Jun. 27, 2016, 3 pages.
Evans, Christine, "The Exciting Possibilities of DIY Virtual Reality", available online at <http://blog.fictiv.com/posts/the-exciting-possibilities-of-diy-virtual-reality>, Dec. 8, 2014, 11 pages.
Hoberman et al., "Immersive Training Games for Smartphone-Based Head Mounted Displays", available online at <http://projects.ict.usc.edu/mxr/wp-content/uploads/2011/12/SmartphoneVR.pdf>, 2012, 2 pages.
Kastrenakes, Jacob, "The Verge: This Phone's Packaging Doubles as a Google Cardboard VR viewer", Feb. 10, 2016, 2 pages.
Ladysith, "Copper Tape Touch Extension for Cardboard VR Kits", available online at <https://web.archive.org/web/20150101222824/http://www.instructables.com/id/CoppertapetouchextensionforCardboardVRkits>, Jan. 1, 2015, 5 pages.
Tested, "Hands-On with Google Cardboard Virtual Reality Kit", available online at <https://www.youtube.com/watch?v=eT9vmpE8WcY>, Jun. 30, 2014, 1 page.
Touthackamon, "How to Make DODOCase VR kit V 1.2 from Your Old V 1.1", available online at <https://web.archive.org/web/20141101135535/http://www.instructables.com/id/How-to-make-DODOCase-VR-kit-V-12-from-your-old-V-1/>, Nov. 1, 2014, 8 pages.
International Search Report and Written Opinion Received for PCT Patent Application No. PCT/US2016/034756, dated Sep. 2, 2016, 10 pages.
Written Opinion (Chapter II) Received for PCT Patent Application No. PCT/US2016/034756, dated Jul. 3, 2017, 5 pages.
International Preliminary Report on Patentability for PCT Patent Application No. PCT/US2016/034756, dated Oct. 20, 2017, 7 pages.
International Preliminary Report on Patentability for PCT Patent Application No. PCT/US2016/033212, dated Dec. 7, 2017, 10 pages.
International Search Report and Written Opinion Received for PCT Patent Application No. PCTUS2016033212, dated Sep. 23, 2016, 15 pages.
Invitation to Pay Additional Fees and Partial Search for PCT Patent Application No. PCT/US2016/033212, dated Aug. 1, 2016, 7 pages.
International Search Report and Written Opinion Received for Patent Application No. PCT/US2016/043492, dated Feb. 12, 2016, 13 pages.
International Search Report and Written Opinion for International Application No. PCT/US2018/050488, dated Jan. 4, 2019, 19 pages.
Extended European Search Report for European Application No. 18185679.0, dated Nov. 20, 2018, 5 pages.
Office Action with English Translation for Japanese Application No. 2017-555534, dated Jan. 29, 2019, 13 pages.

* cited by examiner

SWITCHABLE VIRTUAL REALITY HEADSET AND AUGMENTED REALITY DEVICE

CROSS REFERENCE TO RELATED APPLICATION

This application claims priority to U.S. Application No. 62/556,860, filed Sep. 11, 2017, the disclosure of which is incorporated herein by reference in its entirety.

BACKGROUND

Various types of systems can generate immersive environments for users. For example, a virtual reality (VR) system generates an immersive virtual environment for a user. The immersive virtual environment can be three-dimensional (3D) and can include multiple virtual objects with which the user may interact. As another example, an augmented reality (AR) system generates an immersive augmented environment for a user. The immersive augmented environment can be generated by superimposing computer-generated images on a user's field of view of the real world.

The user can experience these immersive environments via various display devices such as, for example, a helmet or other head mounted device including a display, glasses, or goggles that a user looks through when viewing a display.

The user may interact with the immersive environment in a variety of ways. For example, the user may use hand movements to interact with the immersive environment. The user may also manipulate a controller to interact with the immersive environment.

SUMMARY

This disclosure relates to a switchable viewing assembly for virtual reality and augmented reality environments. In at least some implementations, components of the switchable viewing assembly can be repositioned to switch the switchable viewing assembly from an augmented reality configuration to a virtual reality configuration.

One aspect is a device comprising: a handle formed from folded sheets of material; a device chamber coupled to the handle, configured to hold a computing device, and formed from folded sheets of material; a viewport assembly formed at least in part from folded sheets of material; and a hinge assembly that pivotably couples the device chamber to the viewport assembly.

Another aspect is a system comprising: a computing device; and a switchable viewing assembly including: a handle; a device chamber coupled to the handle and configured to hold the computing device; a viewport assembly; and a hinge assembly that pivotably couples the device chamber to the viewport assembly.

Yet another aspect is a device comprising: a handle formed from folded sheets of material; a device chamber coupled to the handle, formed from folded sheets of material; a viewport assembly formed at least in part from folded sheets of material; and a hinge assembly that pivotably couples the device chamber to the viewport assembly and is operable to adjust the device between a virtual reality configuration and an augmented reality configuration, a display of a computing device held in the device chamber being viewable through the viewport assembly in the virtual reality configuration and the display being viewable without the viewport assembly in the augmented reality configuration.

The details of one or more implementations are set forth in the accompanying drawings and the description below. Other features will be apparent from the description and drawings, and from the claims.

DETAILED DESCRIPTION

Figure 1:
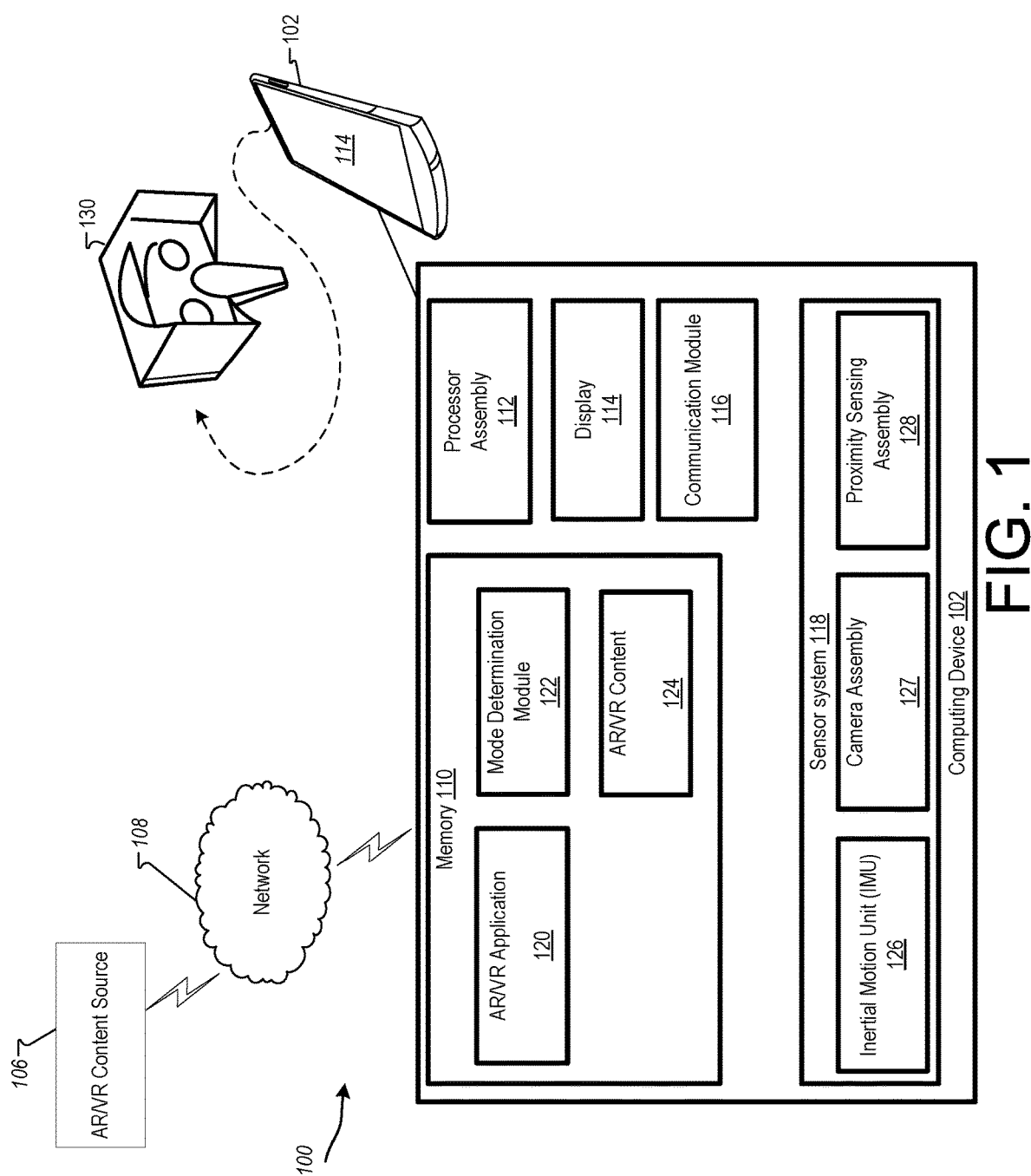
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

This disclosure is directed to a switchable altered reality system that includes a switchable altered reality device that can be used as a virtual reality (VR) headset or an augmented reality (AR) viewer that can be provided to users at a relatively low cost, as compared with other VR headset implementations. The system may include an electronic device that includes a display panel, such as a smartphone, a tablet, etc. VR and/or AR applications or content can be executed on the electronic device. The electronic device may be inserted into and secured within the switchable altered reality device. A user can then view images associated with (produced by) the VR and/or AR applications or content that are displayed on the display panel of the electronic device using the switchable altered reality device to experience the content as virtual reality content (e.g., in a virtual three-dimensional view) or augmented reality content (e.g., as computer generated imagery that overlays a view of the real world). For example, a virtual reality environment may be an immersive three-dimensional computer generated environment. In some implementations, the virtual reality environment does not include any content from the physical environment surrounding the user of the device. For example, the virtual reality environment may not include any image or video content captured by a camera assembly of the switchable altered reality device. An augmented reality environment includes a combination of computer generated content and content from the physical environment surrounding the system. For example, the augmented reality environment may incorporate physical entities from the surrounding environment into a computer generated environment. As another example, the augmented reality environment may overlay computer generated content over image or video content captured with a camera assembly of the switchable altered reality device.

In at least some implementations, the system includes a stereoscopic display, when configured in a VR mode, in which different images and/or videos are shown to each of the user's eyes to convey depth. When configured in an AR mode, the system may include a non-stereoscopic display that shows images that are simultaneously viewable by both of the user's eyes. For example, in some implementations, the system overlays content over photographs or videos of the surrounding physical environment that are captured with a camera of the electronic device. The switchable altered reality device may be made from one or more sheets of cardboard, paper, rigid sheet plastic or sheet metal and may include one or more hinges that allow for reconfiguration between a VR mode and an AR mode. The hinges may be formed within the sheets of materials with perforations, scores (e.g., lines cut into the surface), or creases.

FIG. 1 is a block diagram illustrating a system 100 according to an example implementation. The system 100 generates an altered reality environment, such as an AR environment or VR environment for a user of the system 100. In some implementations, the system 100 includes a computing device 102, a switchable altered reality device 130, and an AR/VR content source 106. Also shown is a network 108 over which the computing device 102 may communicate with the AR/VR content source 106.

In some implementations, the computing device 102 is a mobile device (e.g., a smart phone) which may be configured to provide or output AR/VR content to a user. The computing device 102 may include a memory 110, a processor assembly 112, a display 114, a communication module 116, and a sensor system 118. The memory 110 may include an AR/VR application 120, a mode determination module 122, and AR/VR content 124. The computing device 102 may also include various user input components (not shown) such as a handheld electronic device that communicates with the computing device 102 using a wireless communications protocol.

The memory 110 can include one or more non-transitory computer-readable storage media. The memory 110 may store instructions and data that are usable to generate an immersive environment for a user.

The processor assembly 112 includes one or more devices that are capable of executing instructions, such as instructions stored by the memory 110, to perform various tasks, such as generating an altered reality environment, and determining a mode in which the system will operate (e.g., VR mode or AR mode). For example, the processor assembly 112 may include a central processing unit (CPU) and/or a graphics processor unit (GPU). For example, if a GPU is present, some image or video rendering tasks associated with generating the altered reality environment may be offloaded from the CPU to the GPU.

The display 114 may, for example, include an LCD (liquid crystal display) screen, an OLED (organic light emitting diode) screen, a touchscreen, or any other screen or display for displaying images or information to a user.

The communication module 116 includes one or more devices for communicating with other computing devices, such as the AR/VR content source 106. The communication module 116 may communicate via wireless or wired networks.

The sensor system 118 may include various sensors, including an inertial motion unit (IMU) 126, a camera assembly 127, and a proximity sensing assembly 128. Implementations of the sensor system 118 may also include different types of sensors, including, for example, a light sensor, an audio sensor, an image sensor, a contact sensor such as a capacitive sensor, a timer, and/or other sensors and/or different combination(s) of sensors.

The IMU 126 detects motion, movement, and/or acceleration of the computing device 102. The IMU 126 may include various types of sensors such as, for example, an accelerometer, a gyroscope, a magnetometer, and other such sensors. A position and orientation of the computing device 102 may be detected and tracked based on data provided by the sensors included in the IMU 126. The detected position and orientation of the computing device 102 may allow the system to, in turn, detect and track the user's gaze direction and/or head movement.

The camera assembly 127 may include one or more cameras that use optical sensors to capture images. The camera assembly may also include one or more lenses disposed on a surface of the computing device 102. The camera assembly 127 may also capture sequences of images (e.g., videos) of the environment around the computing device 102. These images or videos may, for example, be used to generate an AR environment for a user of the computing device 102.

The proximity sensing assembly 128 may detect whether an object is within a predetermined proximity to the front of the computing device 102 (e.g., within 10 mm (0.4 inches), 20 mm (0.8 inches), 25.4 mm (1 inch), 30 mm (1.2 inches), 50.8 mm (2 inches), 152.4 mm (6 inches)). For example, the proximity sensing assembly 128 may be usable to determine when the computing device 102 is being held near a user's face. Additionally or alternatively, the proximity sensing assembly 128 may determine that distance to an object positioned in front of the computing device 102. In some implementations, the proximity sensing assembly 128 may includes an infrared emitter and an infrared receiver. The infrared receiver receives infrared emitted by the infrared emitter and then reflected by an external object. Based on the strength of the received signal or the phase shift of the received signal, the presence of and/or distance to an object positioned in front of the computing device 102 may be determined.

The AR/VR application 120 may generate and present an altered reality environment to a user via one or more output devices of the computing device 102 such as the display 114, a speaker(s) (not shown), and/or other output devices. In some implementations, the AR/VR application 120 includes instructions stored in the memory 110 that, when executed by the processor assembly 112, cause the processor assembly 112 to perform the operations described herein. For example, the AR/VR application 120 may generate and present an augmented reality environment to the user based on, for example, AR/VR content, such as the AR/VR content 124 and/or AR/VR content received from the AR/VR content source 106. The AR/VR content 124 may include 3D scenes that can be rendered as images or videos for display on the display 114. For example, the 3D scene can include one or more objects represented as polygonal meshes. The polygonal meshes may be associated with various surface textures, such as colors and images. The 3D scene may also include other information such as, for example, light sources that are used in rendering the 3D scene.

The AR/VR application 120 may use the mode determination module 122 to select between generating AR content or VR content. In some implementations, the mode determination module 122 includes instructions stored in the memory 110 that, when executed by the processor assembly 112, cause the processor assembly 112 to perform the operations described herein. In some implementations, the mode determination module 122 determines a mode based on signals from the proximity sensing assembly 128. For example, the presence of an object in proximity to the front of the computing device 102 may cause the mode determination module 122 to select a VR mode, while the absence of an object in proximity to the front of the computing device 102 may cause the mode determination module 122 to select an AR mode.

The AR/VR application 120 may update the AR/VR environment based on input received from the IMU 126 and/or other components of the sensor system 118. For example, the IMU 126 may detect motion, movement, and/or acceleration of the computing device 102 and/or the display 114. The IMU 126 may include various different types of sensors such as, for example, an accelerometer, a gyroscope, a magnetometer, and other such sensors. A position and orientation of the computing device 102 may be detected and tracked based on data provided by the sensors included in the IMU 126. The detected position and orientation of the computing device 102 may allow the system to in turn, detect and track the user's gaze direction and head movement. Based on the detected gaze direction and head movement, the AR/VR application 120 may update the AR/VR environment to reflect a changed orientation and/or position of the user within the environment.

Although the computing device 102 and the switchable altered reality device 130 are shown as separate devices in FIG. 1, in some implementations, the computing device 102 may include the switchable altered reality device 130.

The AR/VR content source 106 may generate and output AR/VR content, which may be distributed or sent to one or more computing devices, such as the computing device 102, via the network 108. In an example implementation, the AR/VR content includes three-dimensional scenes and/or images. Additionally, the AR/VR content may include audio/video signals that are streamed or distributed to one or more computing devices. The AR/VR content may also include an AR/VR application that runs on the computing device 102 to generate 3D scenes, audio signals, and/or video signals and to process hand interactions with an immersive environment. According to an illustrative example implementation, virtual reality (VR) may generate an immersive environment by, at least in some cases, replicating or simulating, to varying degrees, an environment or physical presence in places in the real world or imagined worlds or environments. Augmented reality (AR) may generate an altered reality environment by, at least in some cases, overlaying computer generated images on a user's field of view of the real world.

The network 108 may be the Internet, a local area network (LAN), a wireless local area network (WLAN), and/or any other network. A computing device 102, for example, may receive the audio/video signals via the network 108, which may be provided as part of VR content in an illustrative example implementation.

Figure 2:
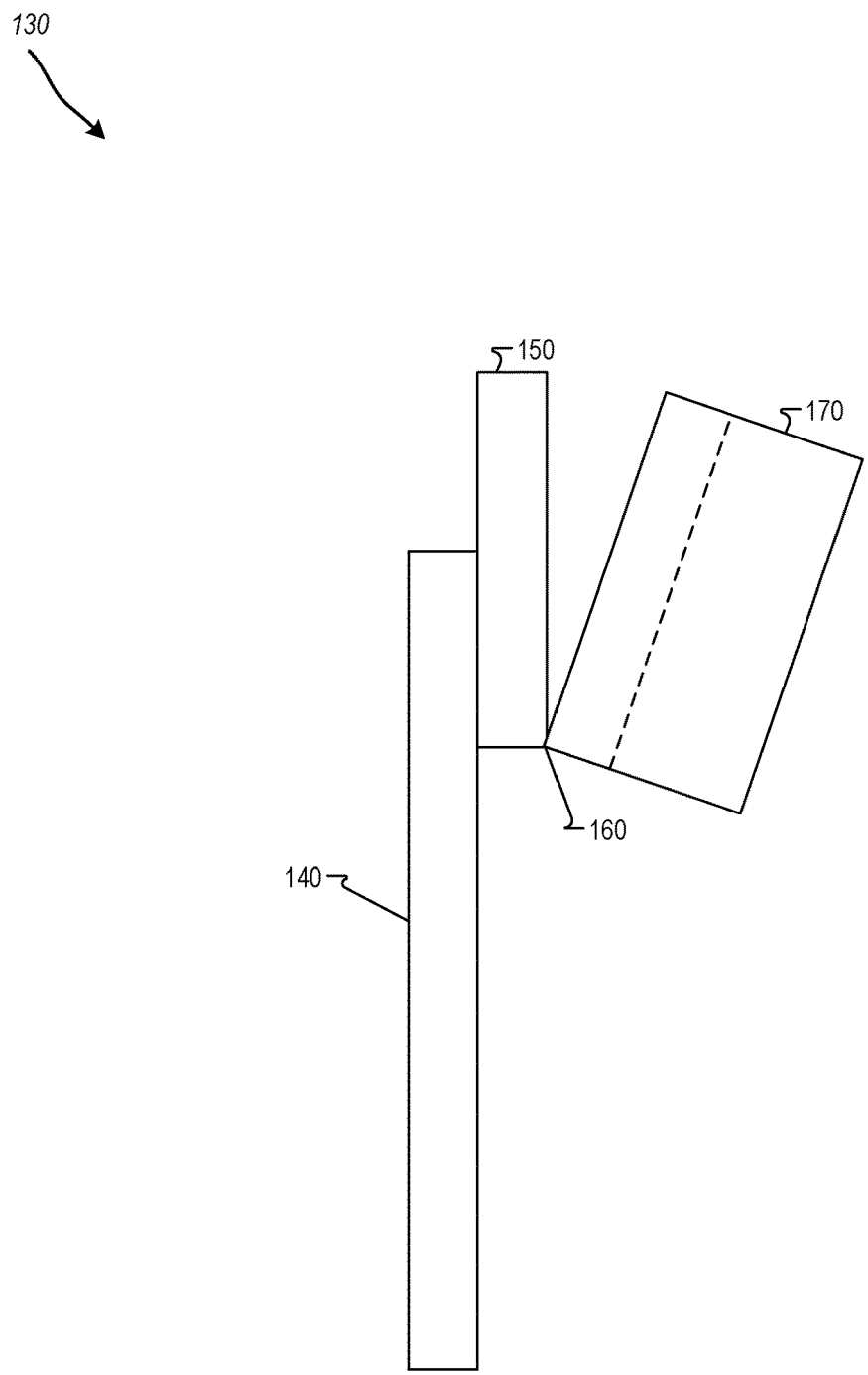
FIG. 2 is a schematic diagram of an implementation of the switchable altered reality device of FIG. 1.

FIG. 2 is a schematic diagram of an implementation of the switchable altered reality device 130. In this example, the switchable altered reality device 130 includes a handle 140, a device chamber 150, a hinge 160, and a viewport assembly 170. In some implementations, the handle 140, the device chamber 150, the hinge 160, and the viewport assembly 170 may be formed from one or more folded sheets of material (e.g., cardboard). In some implementations, the viewport assembly 170 may include other components formed from other types of materials, such as plastic lenses, that are inserted into the folded sheets of material.

In some implementations, the handle 140 is a rigid, oblong structure that is sized to be held by a user. The user may use the handle 140 to position the switchable altered reality device 130. For example, in a VR mode, the user may use the handle 140 to position the switchable altered reality device 130 so as to look directly into the viewport assembly 170. In the AR mode, the user may use the handle 140 to position the switchable altered reality device 130 out in front so that the device chamber 150 can be viewed from a distance. The handle 140 may be formed from a sheet of material that is folded or rolled into an oblong shape. The handle 140 may also be formed from a solid or hollow material such as molded metal or plastic or extruded metal or plastic.

The device chamber 150 may be configured to hold a computing device such as the computing device 102. The device chamber 150 may be formed by folding one or more sheets of material into a rectangular prism shape. Some implementations of the device chamber 150 may include a slot through which the computing device may be inserted. Some implementations of the device chamber 150 include a flap that can be removable opened and closed to access the chamber and insert the computing device. In some implementations, the device chamber 150 is configured to securely hold a computing device so as to prevent or reduce movement of the computing device within the device chamber 150 as the switchable altered reality device 130 is moved around via the handle 140. In some implementations, the device chamber 150 includes an insert sized to fit a specific type of computing device. For example, several different inserts may be available for common mobile phone models. These inserts may allow a device chamber 150 to be used to securely hold several different models of computing devices. The device chamber 150 may include a view panel through which a display of the computing device can be viewed.

The hinge 160 may pivotably connect the viewport assembly 170 to the device chamber 150. For example, the hinge 160 may allow for repeated rotational movement. In some implementations, the hinge 160 is a region of a sheet of material in which one or more of a crease, score, or perforation has been added. In some implementations, a user can switch from an AR mode to a VR mode by rotating the viewport assembly 170 about the hinge 160 from a first position (e.g., away from the device chamber 150) to a second position (near to the device chamber 150).

The viewport assembly 170 may be configured to be held against a user's face. For example, the viewport assembly 170 may be contoured to fit against a user's face. In some implementations, the viewport assembly 170 is configured to enhance three-dimensional perception when viewing stereoscopic content on a display of a computing device contained in the device chamber 150. For example, the viewport assembly 170 may include lenses or dividers that limit the user's field of view from each eye to specific portions of the stereoscopic content. For example, the stereoscopic content may include a left-eye image portion and a right-eye image portion. The left-eye image portion and right-eye image may include slightly different views of a scene such that when viewed with the corresponding eyes parallax is simulated to cause a perception of three-dimensional content. The viewport assembly 170 may also include blinders to prevent or reduce light from the environment reaching the user's eyes. As noted above, when used in the AR mode, the viewport assembly 170 may pivot around the hinge 160 into a downward position near the handle 140 so that it does not occlude the user's view of a display of a computing device contained within the device chamber 150.

Figure 3A:
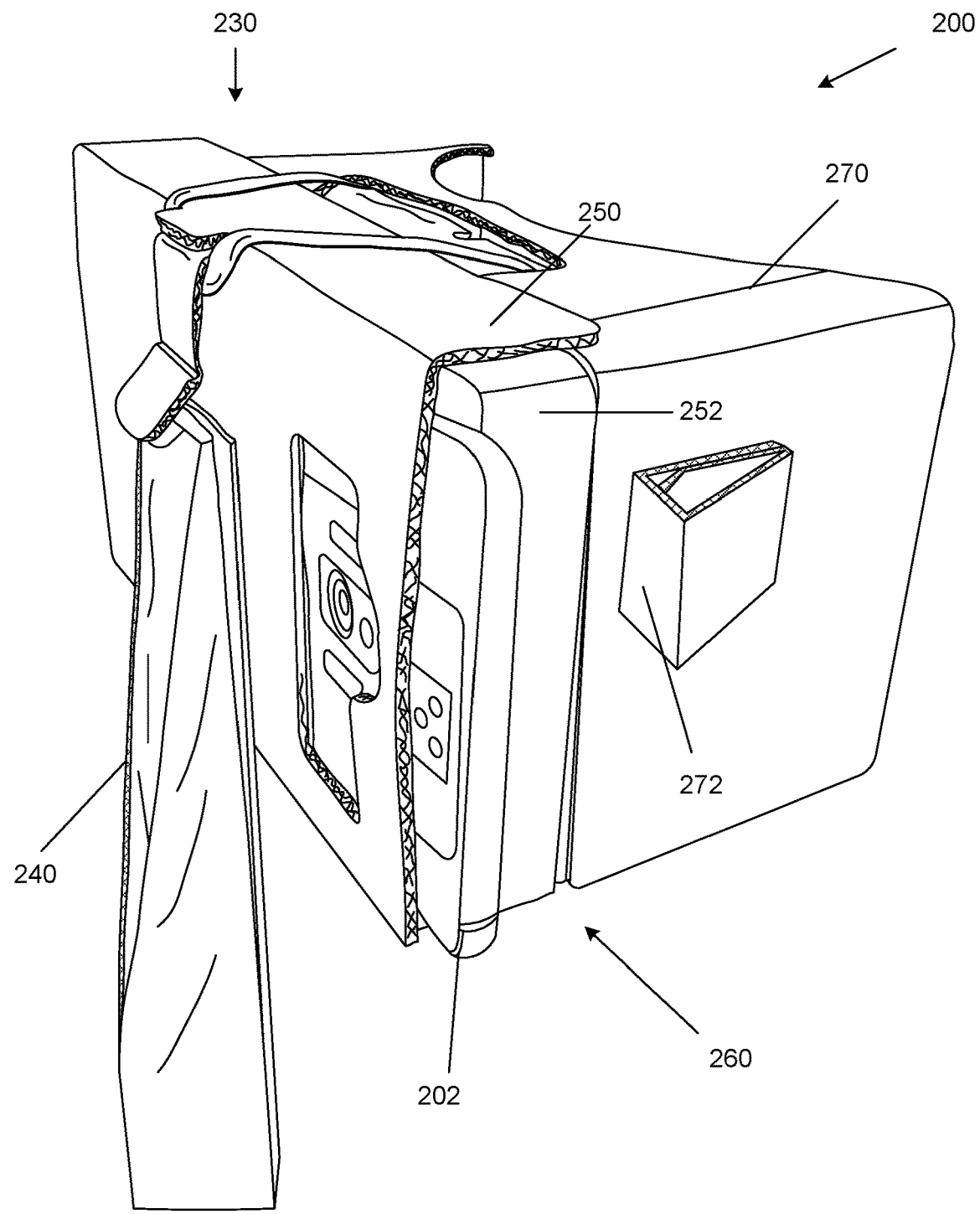
FIGS. 3A-3D are illustrations of an implementation of the switchable altered reality system of FIG. 2 arranged in a VR configuration, in accordance with implementations as described herein.

FIGS. 3A-3D are illustrations of an example switchable altered reality system 200 arranged in a VR configuration. FIG. 3A shows an angled view of the switchable altered reality system 200. In some implementations, the switchable altered reality system 200 can switch between a virtual reality configuration and an augmented reality configuration. In the virtual reality configuration, the switchable altered reality system 200 may operate as a virtual reality headset. In the augmented reality configuration, the switchable altered reality system 200 may operate as an augmented reality viewer.

In some implementations, the switchable altered reality system 200 includes a switchable viewing assembly 230 and a computing device 202. The switchable viewing assembly 230 is an example of the switchable altered reality device 130 and the computing device 202 is an example of the computing device 102.

The switchable viewing assembly 230 may be reconfigurable to switch between the virtual reality configuration and the augmented reality configuration. In at least some implementations, the switchable viewing assembly 230 is formed primarily from one or more folded sheets of cardboard or another material.

Some implementations of the switchable viewing assembly 230 include a handle 240, a device chamber 250, and a viewport assembly 270. The handle 240 may have an oblong shape that extends from the bottom of the switchable viewing assembly 230. The handle 240 may have a cross section with a triangular, square, rectangular, or trapezoidal shape, which may be sized to fit comfortably in a hand of a user.

In some implementations, the handle 240 attaches to a panel of the device chamber 250, such as a panel opposite the user's face when being used in a VR configuration. The device chamber 250 may include an interior chamber for holding the computing device 202. In some implementations, the device chamber 250 has a slot on a side in which the computing device 202 may be inserted and removed. The device chamber may be configured to receive a computing device 202 that is oriented so that its display is oriented toward the viewport assembly 270 and away from the handle 240. The device chamber 250 may include a view panel 252 through which the display of the computing device 202 can be viewed. Additionally, the view panel 252 may help secure the computing device 202 in the device chamber 250. The view panel 252 may be secured to the device chamber 250 with releasable fasteners (not shown), such as a patch of VECLRO™ brand fastener closure system.

Figure 5A:
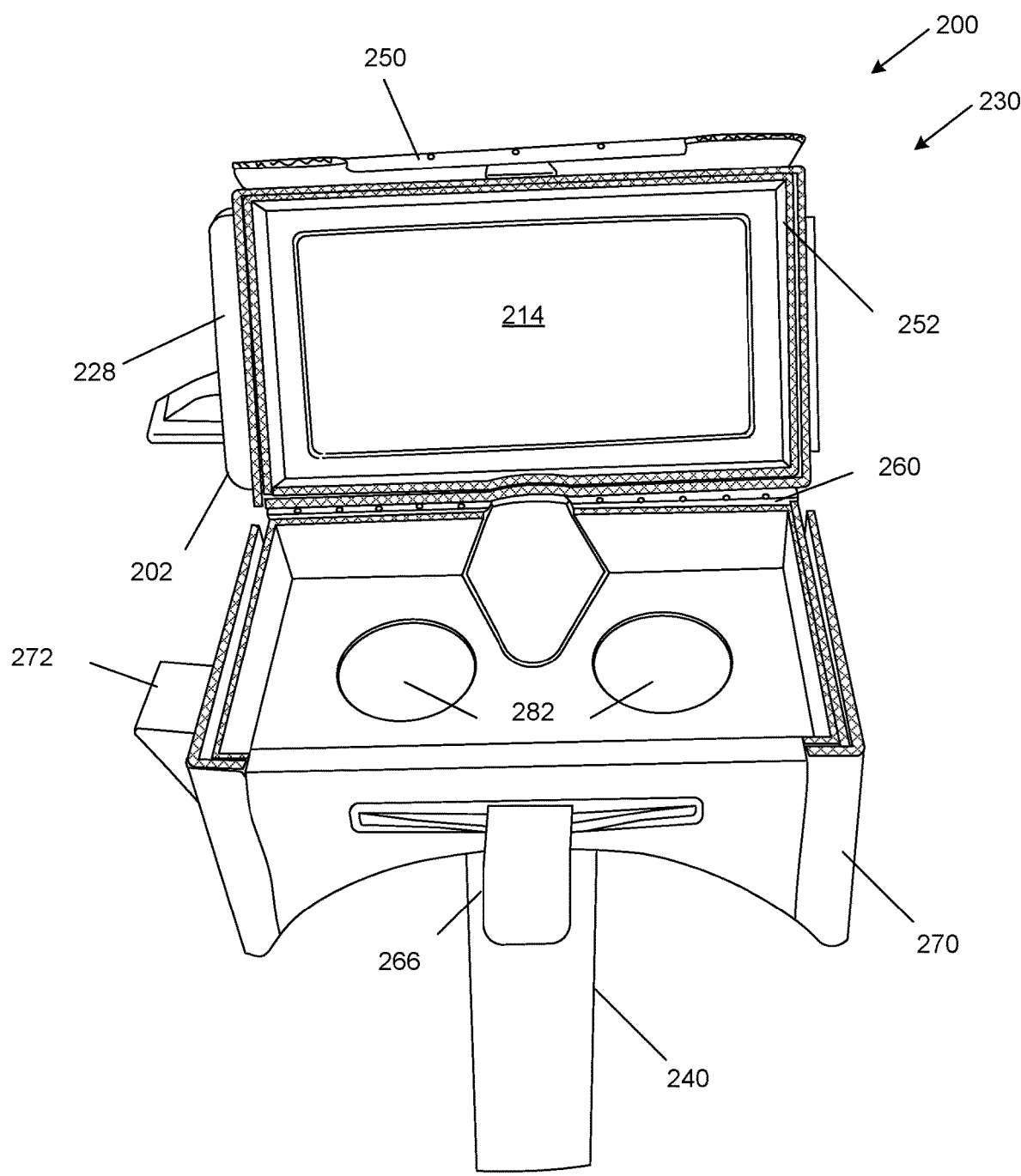
FIGS. 5A-5B are illustrations of the example switchable altered reality system of FIGS. 3A-3D arranged in an AR configuration.
Figure 5B:
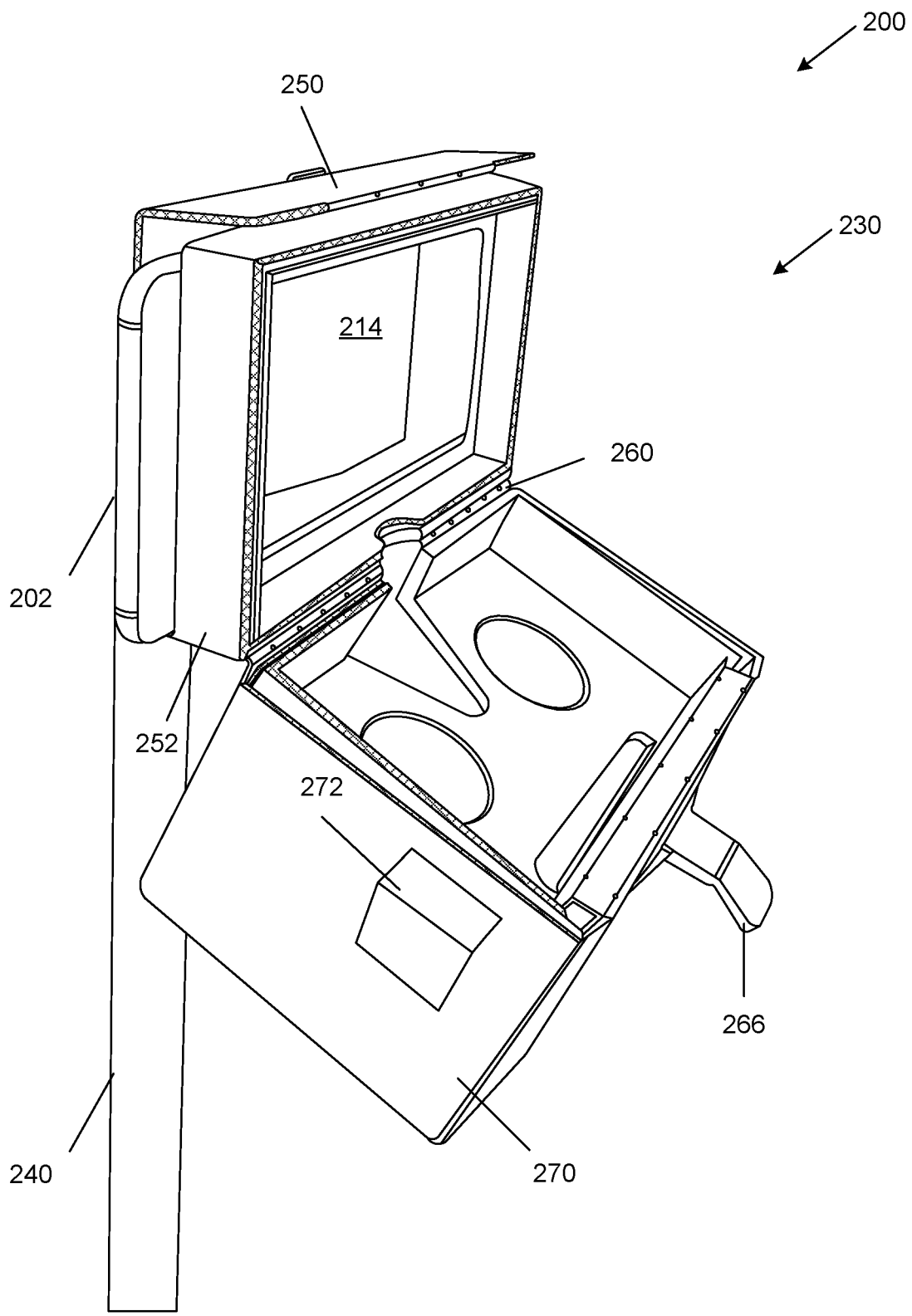

The viewport assembly 270 may be connected to the device chamber 250 with a hinge 260. The hinge 260 may include a scored, creased, or perforated line along a sheet of cardboard or another material. For example, the viewport assembly 270 may be pivotally connected to the device chamber 250. In some implementations, the viewport assembly 270 is rotatably connected to the device chamber 250. The hinge 260 may allow the viewport assembly 270 to pivot around the hinge 260 into a raised position (as shown in FIG. 3A) or to a lowered position (that exposes the view panel 252, as shown in FIGS. 5A and 5B). Implementations of the viewport assembly 270 can include a proximity indicator 272 that can be used in conjunction with a proximity sensing assembly of the computing device 202 to determine a position of the viewport assembly 270 (e.g., whether the viewport assembly 270 is in a raised position or a lowered position). In some implementations, the computing device 202 switches between a VR mode and an AR mode based on the position of the viewport assembly 270 as determined from the proximity indicator 272. In the VR mode, the computing device 202 may provide a stereoscopic display using the display (e.g., by causing two different images to be shown on the display that are meant to be viewed by each eye to convey depth). In the AR mode, the computing device 202 may provide a non-stereoscopic display by causing a single image to be shown on the display.

Figure 3B:
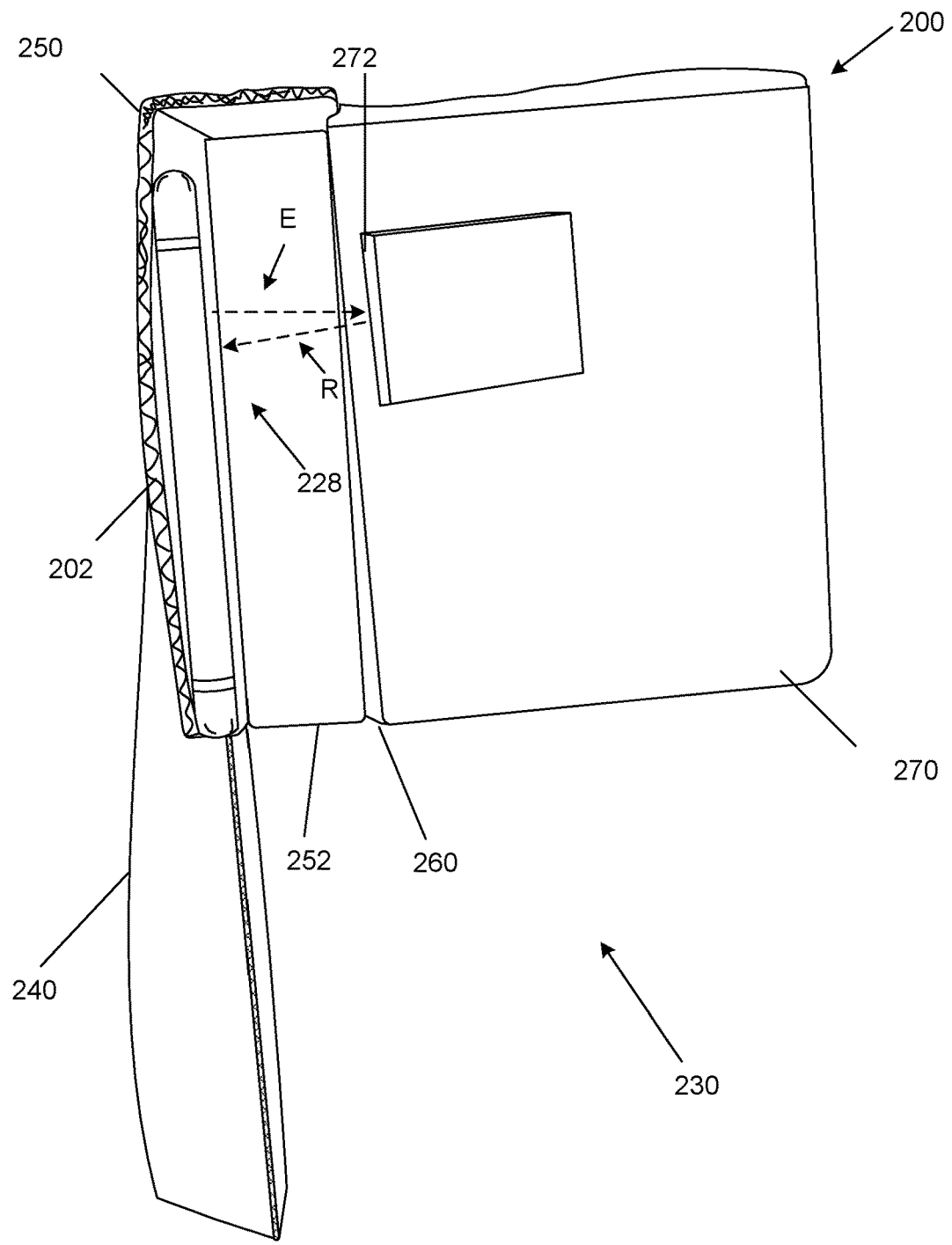

FIG. 3B shows a side view of the switchable altered reality system 200. The computing device 202 includes a proximity sensing assembly 228 disposed adjacent to the display. For example, the proximity sensing assembly 228 may be disposed above the display of a smart phone. The proximity sensing assembly 228 may emit an emitted signal E, such as an infrared signal and may detect a reflected signal R, such as a portion of the emitted signal E that reflects off of the proximity indicator 272. Some implementations determine the position of the viewport assembly 270 based on the presence, absence, or magnitude of the reflected signal R, which may be caused or changed by the presence or location of the proximity indicator 272. The proximity indicator 272 may be removable and may be secured with a releasable fastener, such as Velcro. In some implementations, the position of the viewport assembly 270 (and therefore the VR/AR mode) is determined based on a light sensor, a magnet, or a capacitive component that would touch the display of the computing device 202.

Figure 3C:
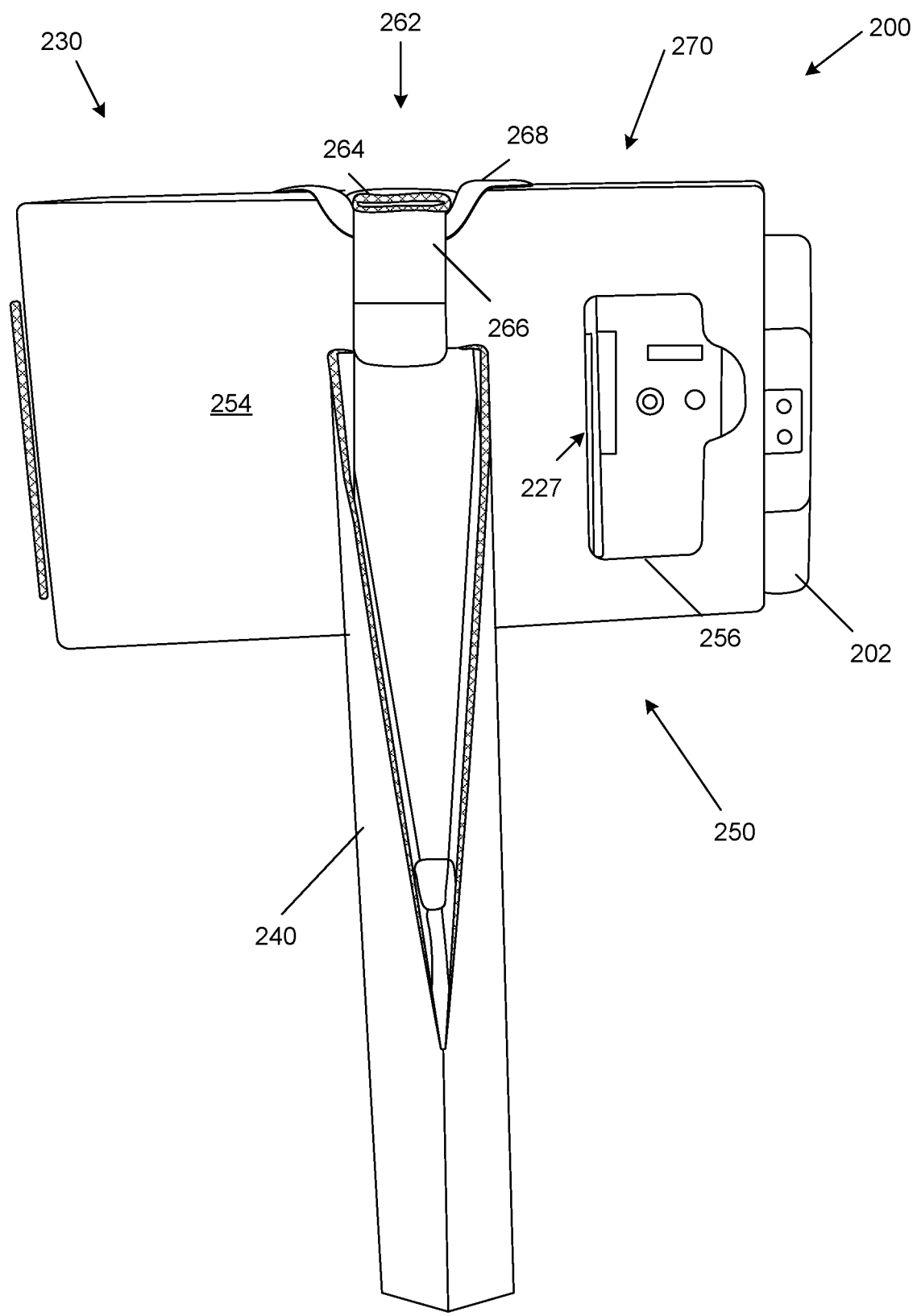

FIG. 3C shows a back view of the switchable altered reality system 200. In some implementations, the device chamber 250 includes a back panel 254 that includes a window 256. For example, the window 256 may be an opening or aperture within the back panel 254. The window 256 may be disposed in the back panel 254 so as not to block a lens of a camera assembly 227 of the computing device 202. In these implementations, the computing device 202 can capture images/videos of the environment proximate the switchable altered reality system 200 while disposed within the device chamber 250. These images/videos may, for example, be used to generate AR content.

The switchable viewing assembly 230 may also include a latching assembly 262. The latching assembly 262 may secure the viewport assembly 270 in the raised position. In some implementations, the latching assembly 262 may include a slot 264, a tab 266, and a cord 268 (which can also be referred to as a strap). The slot 264 may be a narrow aperture or opening within the back panel 254. For example, the slot 264 may be disposed in the back panel 254 and may be sized to receive the tab 266. The tab 266 may be attached to the viewport assembly 270 with the cord 268. The cord 268 may be formed from an elastic material. For example, the cord 268 may be a rubber band. In some implementations, when the tab 266 is inserted into the slot 264, the viewport assembly 270 is held in the upright position. Some implementations include a releasable adhesive or fastener such as a Velcro to hold the tab 266 in place. For example, a component of a releasable fastener may be disposed on the underside of the tab 266 to contact and mates with a corresponding component of the releasable fastener disposed on the back panel 254.

Figure 3D:
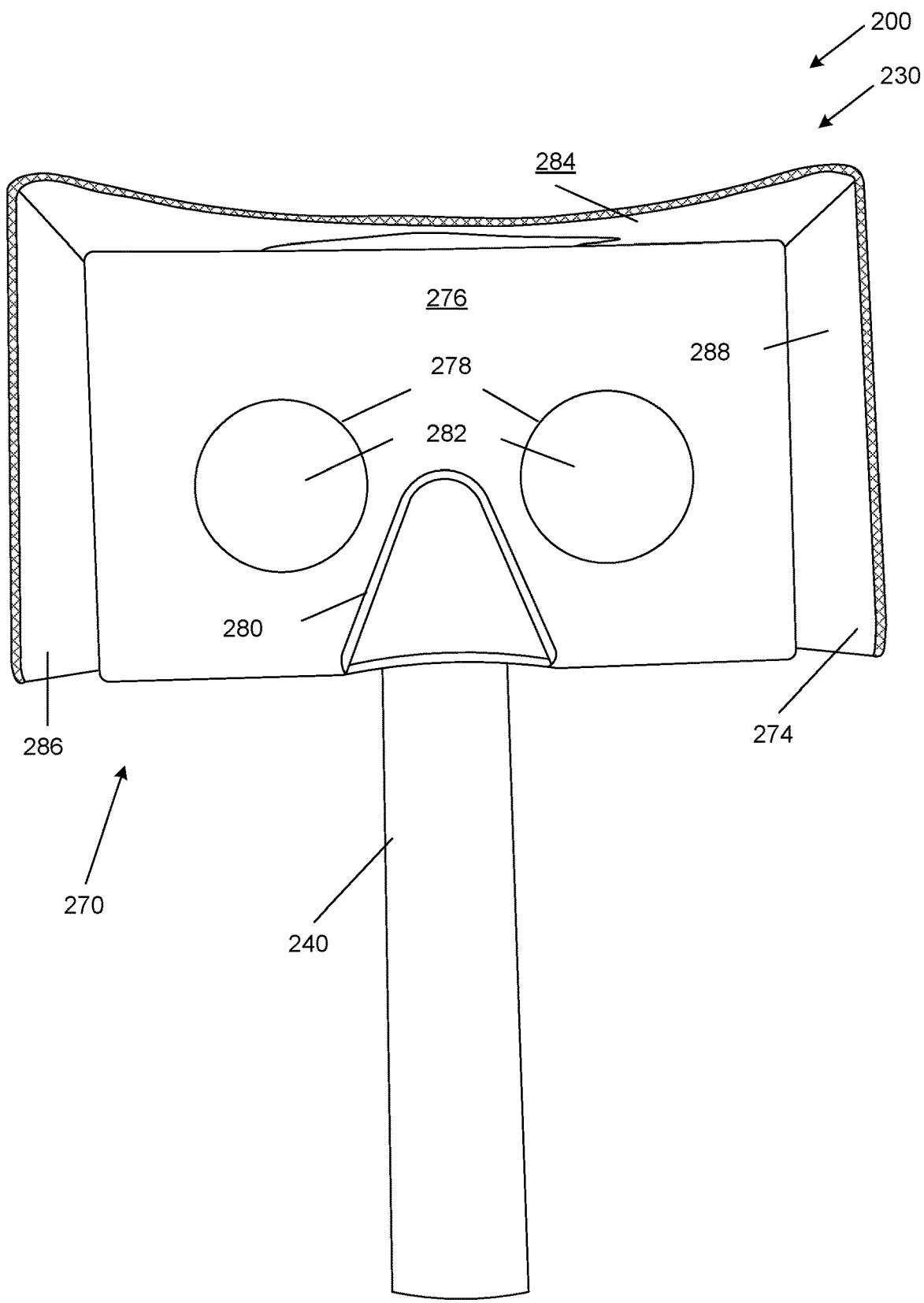

FIG. 3D shows a front view of the switchable altered reality system 200. The viewport assembly 270 includes a blinder assembly 274 and a front panel 276. When the switchable viewing assembly 230 is held near the user's face, the blinder assembly 274 will block some or all external light from reaching the user's eyes. The blinder assembly 274 may include an upper blinder panel 284, a left blinder panel 286, and a right blinder panel 288. The blinder assembly 274 may be configured to reduce the magnitude of ambient light reaching the user's eyes. For example the blinder assembly 274 may reduce the magnitude of ambient light by at least 50%, 75%, 90%, 95%, 98%, 99%, 99.9%, or more. As an example, reducing the magnitude of ambient light reaching the user's eyes may include reducing the magnitude of light directed toward the user's eyes.

The front panel 276 is configured to be near the user's face and may include eye apertures 278 and a nose aperture 280. The viewport assembly 270 may also include lenses 282 (e.g., aspherical lenses) that are disposed in line with the eye apertures 278. The lenses 282 may provide magnification or otherwise alter the perception of images or other graphical content displayed by computing device 202. The eye apertures 278 may limit the view of each of the user's eyes to a portion of the display of the computing device 202 so that the user may perceive depth when viewing stereoscopic images.

Figure 4A:
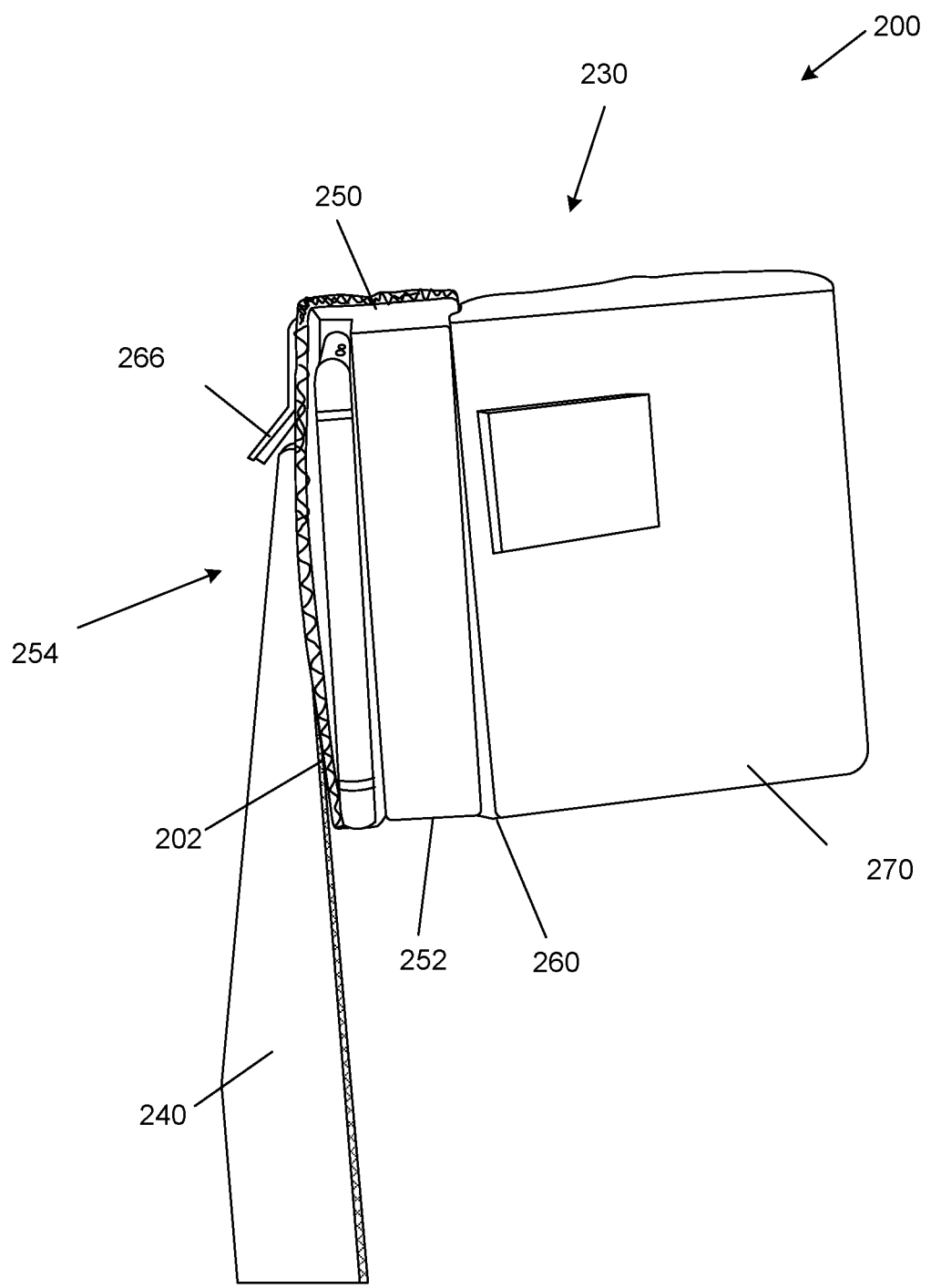
FIG. 4A shows a side view of the altered reality system of FIGS. 3A-3D as the user is switching the switchable view assembly from a VR configuration to an AR configuration.

FIG. 4A shows a side view of the switchable altered reality system 200 as the user is switching the switchable altered reality system 200 from a VR configuration to an AR configuration. In this figure, the user is reaching for the tab 266 so as to separate the tab 266 from the slot 264 and permit the viewport assembly 270 to rotate about the hinge 260 into the lowered position. In some implementations, a force exceeding the release threshold of a releasable fastener is required to separate a portion of the tab 266 from the back panel 254.

Figure 4B:
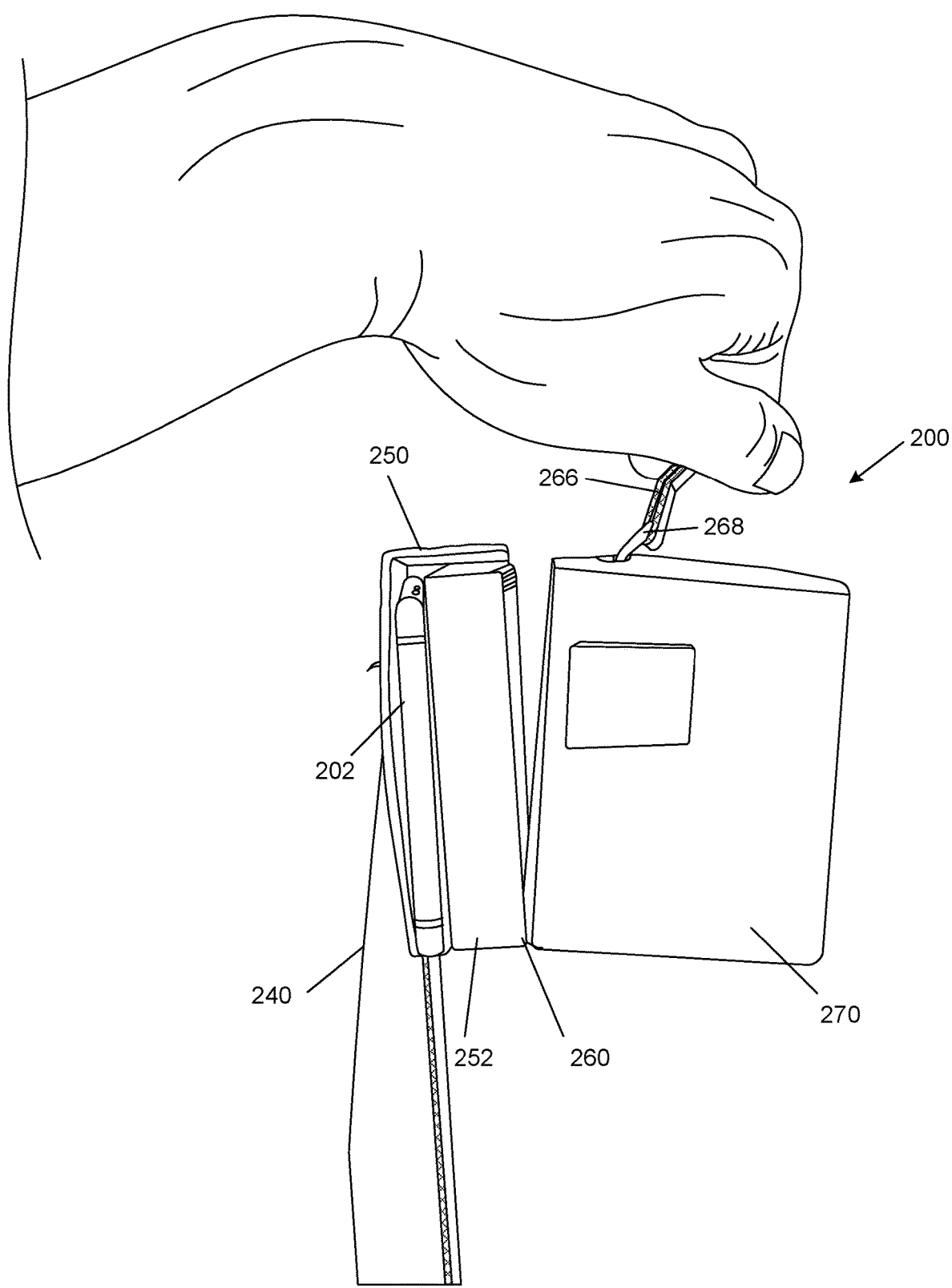
FIG. 4B shows a side view of the altered reality system of FIGS. 3A-3D as the user is continuing to switch the switchable view assembly from a VR configuration to an AR configuration.

FIG. 4B shows a side view of the switchable altered reality system 200 as the user is continuing to switch the switchable altered reality system 200 from a VR configuration to an AR configuration. In this figure, the user has separated the tab 266 from the slot 264 and started to rotate the viewport assembly 270 about the hinge 260 into the lowered position. In this figure, the viewport assembly 270 pivots about the hinge 260.

FIGS. 5A-5B are illustrations of the example switchable altered reality system 200 arranged in an AR configuration. FIG. 5A shows a front view of the switchable altered reality system 200, and FIG. 5B shows a side view of the switchable altered reality system 200. As can be seen, the viewport assembly 270 is in a lowered position and no longer occludes viewing of the display 214 of the computing device 202. For example, the display 214 may be viewed directly through the view panel 252 of the device chamber 250. In this configuration, the proximity indicator 272 is no longer near the proximity sensing assembly 228 of the computing device 202 so the proximity indicator 272 will not reflect emitted signals back to the proximity sensing assembly 228.

Based on the absence of (or other properties of) the reflected signal, the computing device 202 may determine to operate in an AR mode. In the AR mode, the display 214 may display images/videos captured through the camera assembly 227 with various computer generated content overlaid thereon. In some implementations, responsive to determining to switch from a VR mode to an AR mode (e.g. based on a signal from the proximity sensing assembly 228), the computing device 202 may switch from displaying stereoscopic images to displaying non-stereoscopic images.

In some implementations, an additional latching mechanism is included to secure the viewport assembly 270 in the lowered position. For example, the latching mechanism may allow the tab 266 to secure the viewport assembly 270 to the handle 240.

Figure 6A:
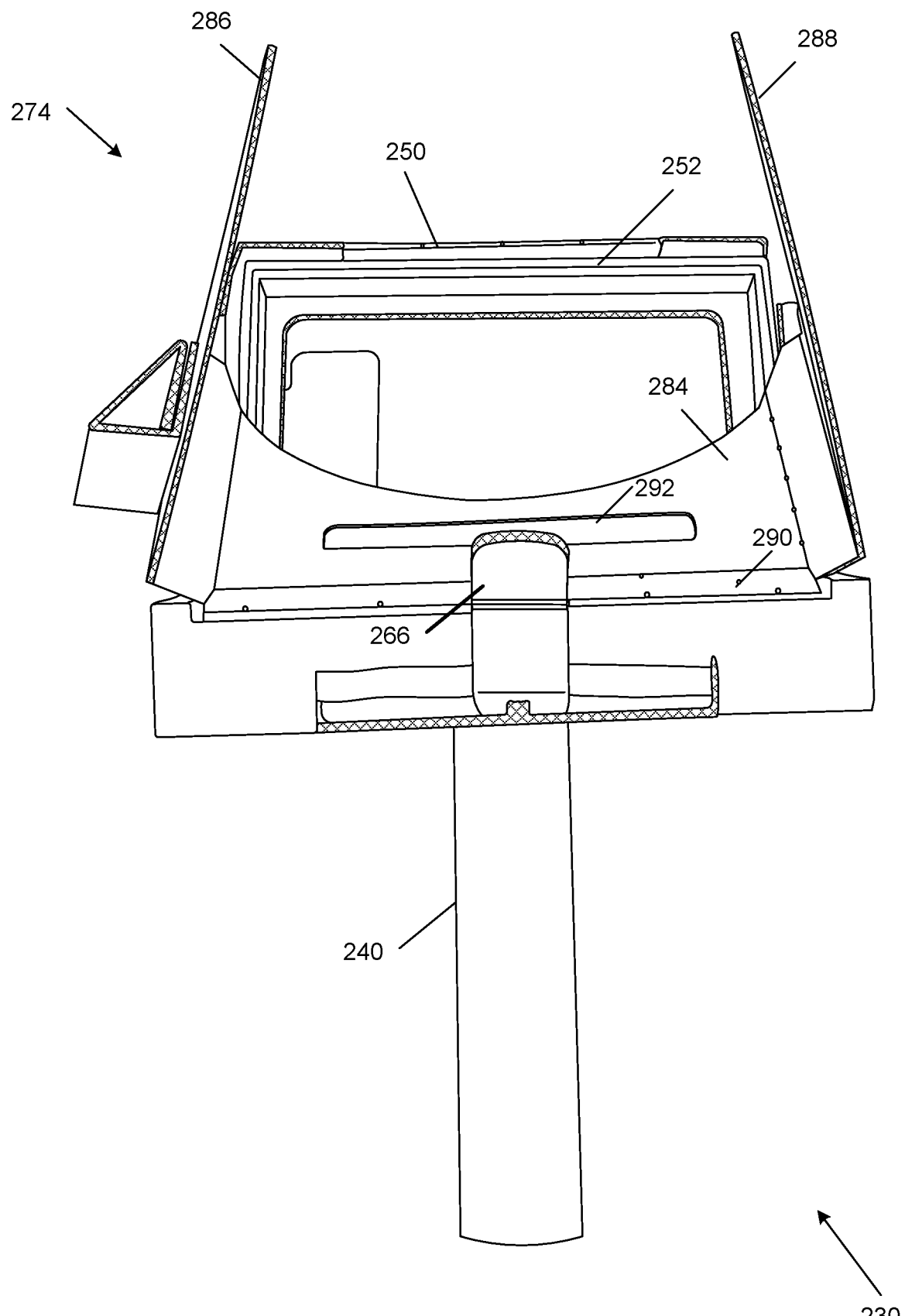
FIGS. 6A-6D show a user converting the switchable viewing assembly of FIGS. 3A-3D to a stowed configuration.

FIGS. 6A-6D show a user converting the switchable viewing assembly 230 to a stowed configuration. In FIG. 6A, the blinder assembly 274 has been rotated around a hinge fold 290. The blinder assembly 274 may include an upper blinder panel 284, a left blinder panel 286, and a right blinder panel 288. In some implementations, the blinder assembly 274 is rotated off of the tab 266 and in towards the device chamber 250. For example, the blinder assembly 274 may include a slot 292, through which the tab 266 may be inserted in some configurations but is removed in the stowed configuration. The slot may be a narrow rectangular aperture in an upper blinder panel 284 of the blinder assembly 274.

Figure 6B:
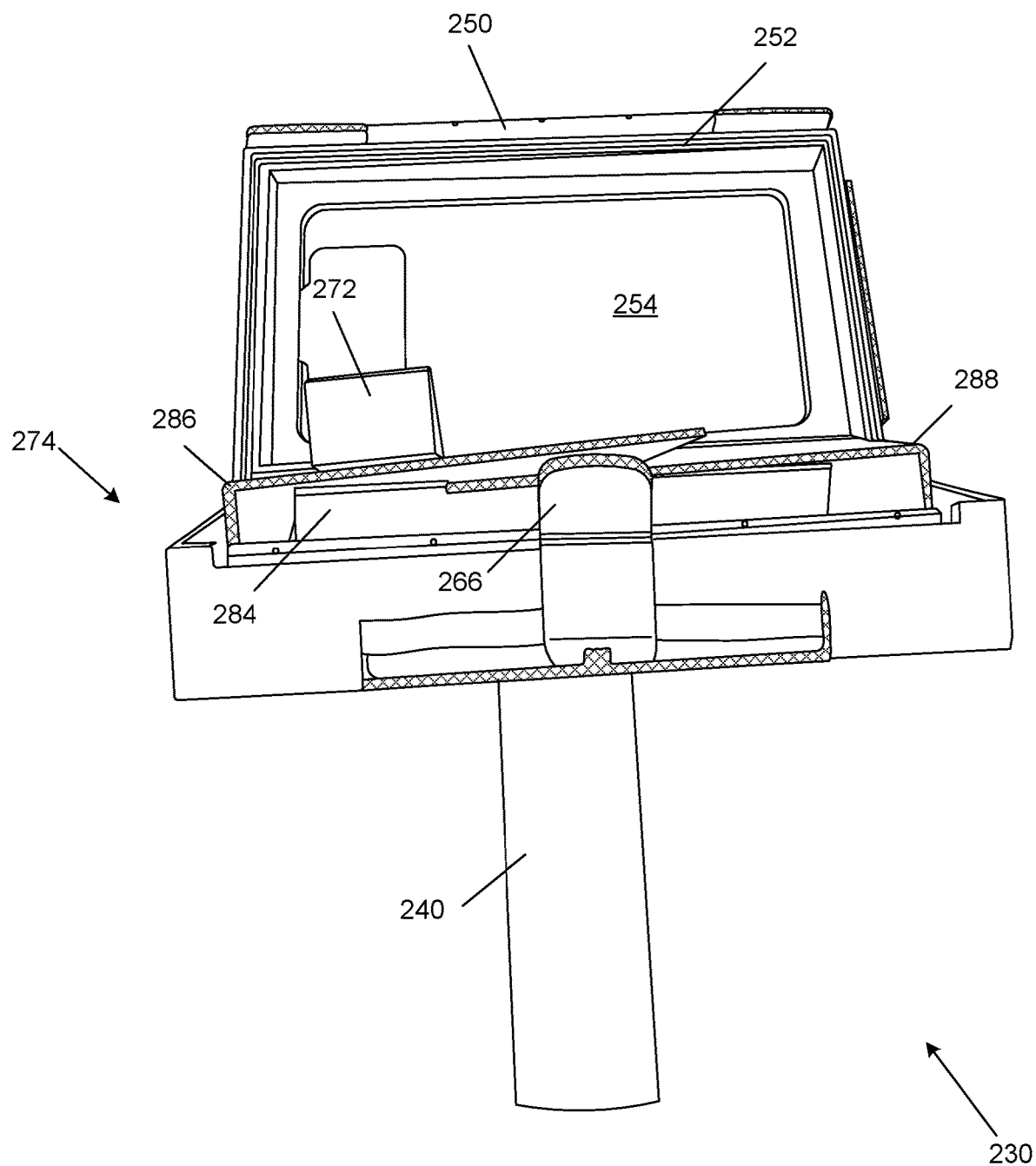
Figure 6C:
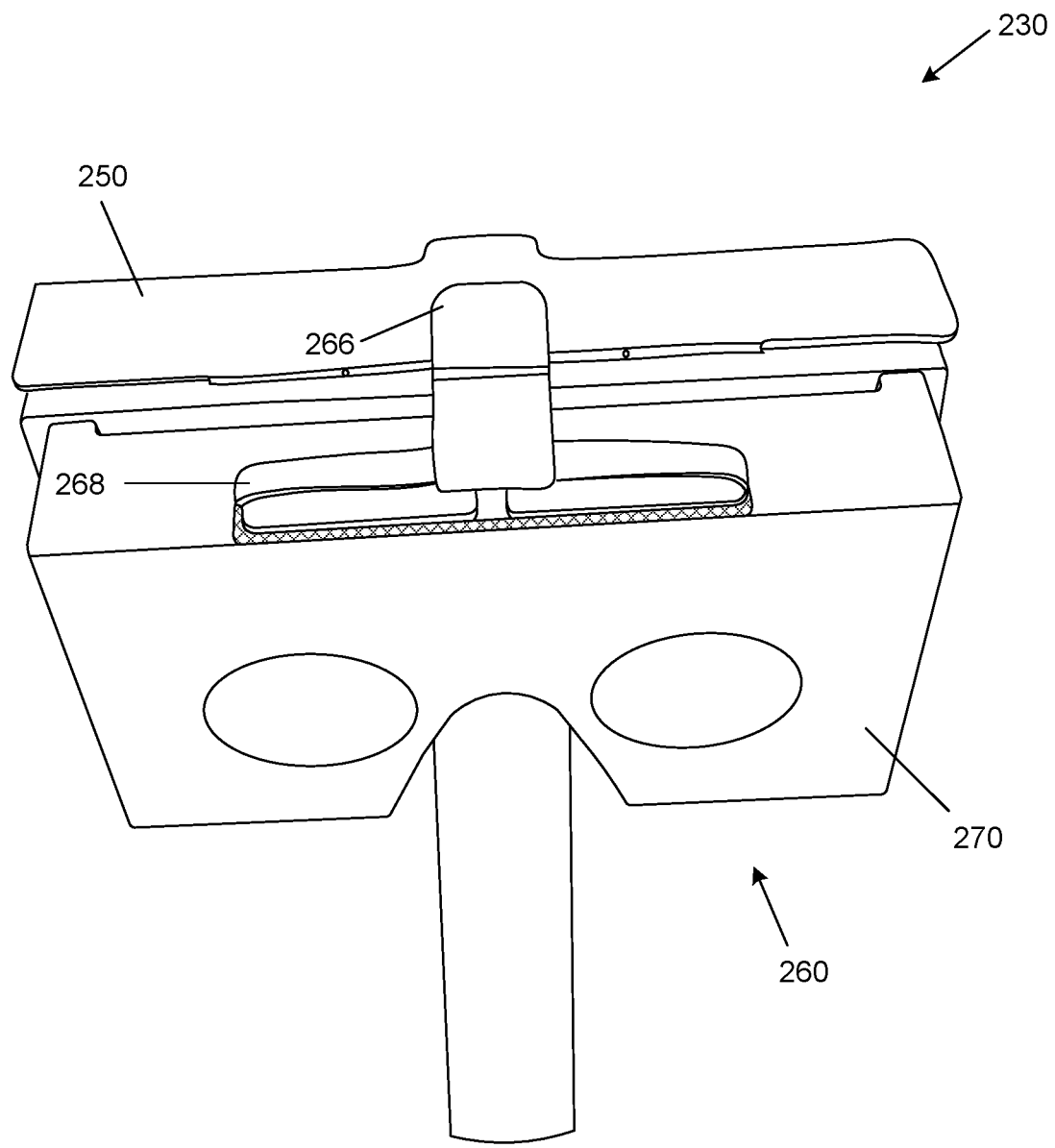
Figure 6D:
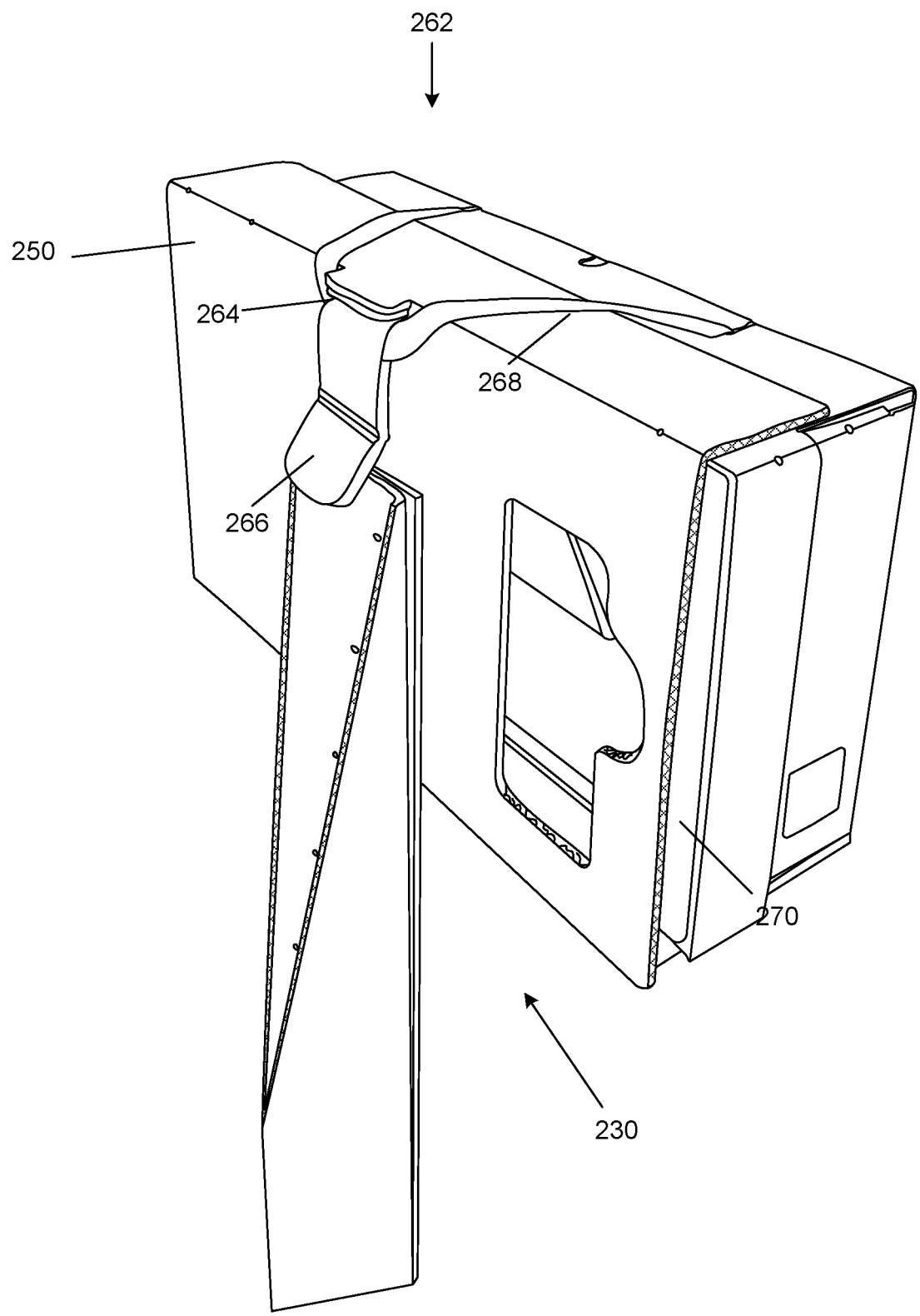

In FIG. 6B, the blinder assembly 274 has been folded in so as to fit into the device chamber 250 (which no longer contains the computing device 202). The upper blinder panel 284 is folded back, then the right blinder panel 288 is folded in on top of the upper blinder panel 284, and then the left blinder panel 286 is folded in on top of the right blinder panel 288. In FIG. 6C, the viewport assembly 270 has been rotated about the hinge 260 back into the raised position. However, the switchable viewing assembly 230 occupies less space in the stowed configuration as compared to the VR configuration because the blinder assembly 274 is stowed. In FIG. 6D, the latching assembly 262 is engaged to secure the viewport assembly 270 into the raised position.

Some implementations may provide for user input by sliding the proximity indicator 272 to alter the amount of signal that is reflected. This reflected value may be determined as a gradient value rather than a binary value. Additionally, some implementations include a cord/strap such as a rubber band disposed along the handle 240 to interact with any of the sensors of the computing device 202 to provide an input mechanism where the hand naturally rests. For example, the cord may be connected to the proximity indicator 272 so as to cause the proximity indicator 272 to be repositioned when the cord is pulled. The changed position of the proximity indicator 272 may change the amount of signal that is reflected. This change in signal may be detected by the proximity sensing assembly 228 of the computing device 202 and recognized as a user input. In some implementations, responsive to a user input the computing device 202 may select or otherwise interact with entity in the AR or VR environment.

Figure 7A:
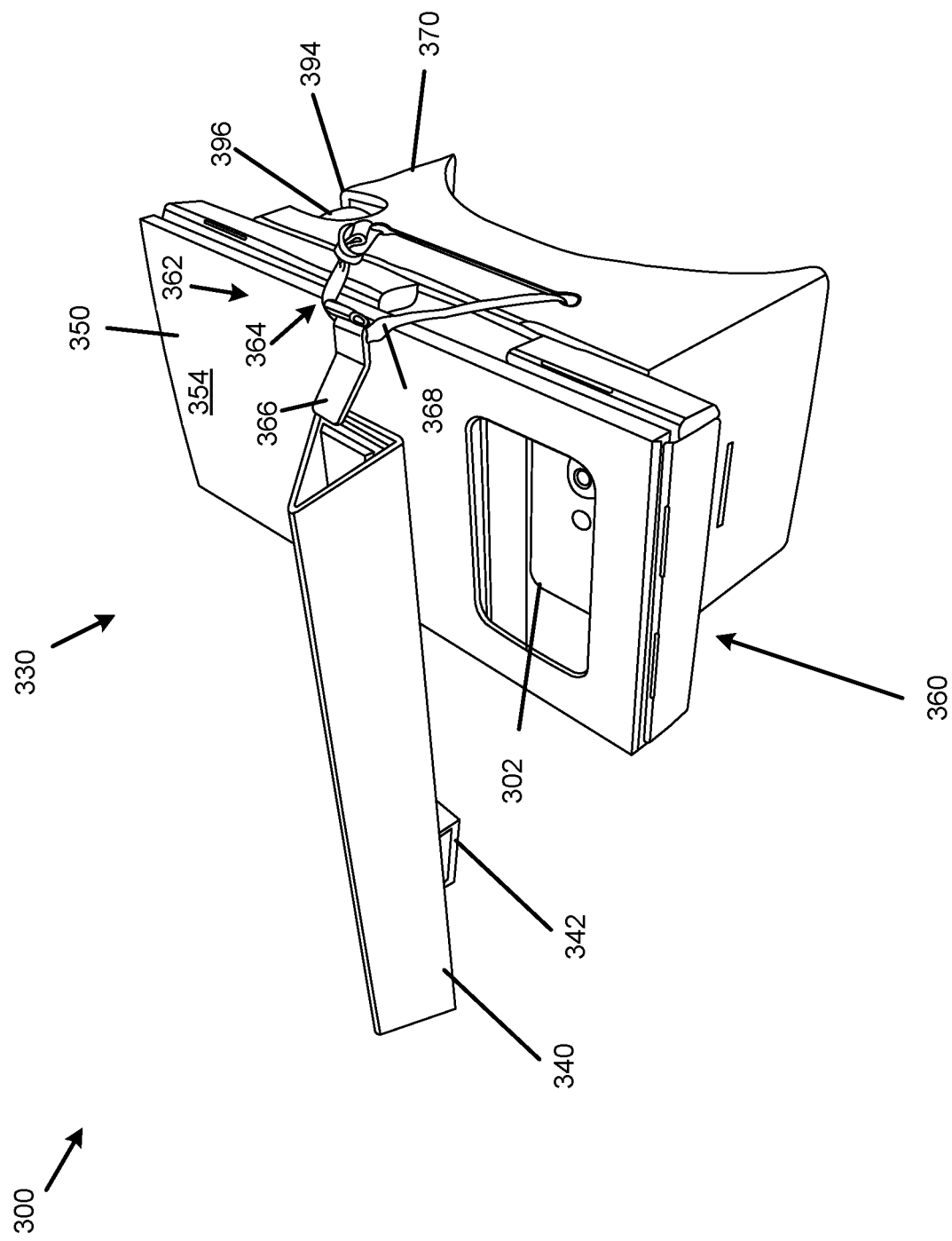
FIGS. 7A-7C are schematic diagrams of an implementation of the switchable altered reality system of FIG. 2 arranged in a VR configuration.
Figure 7B:
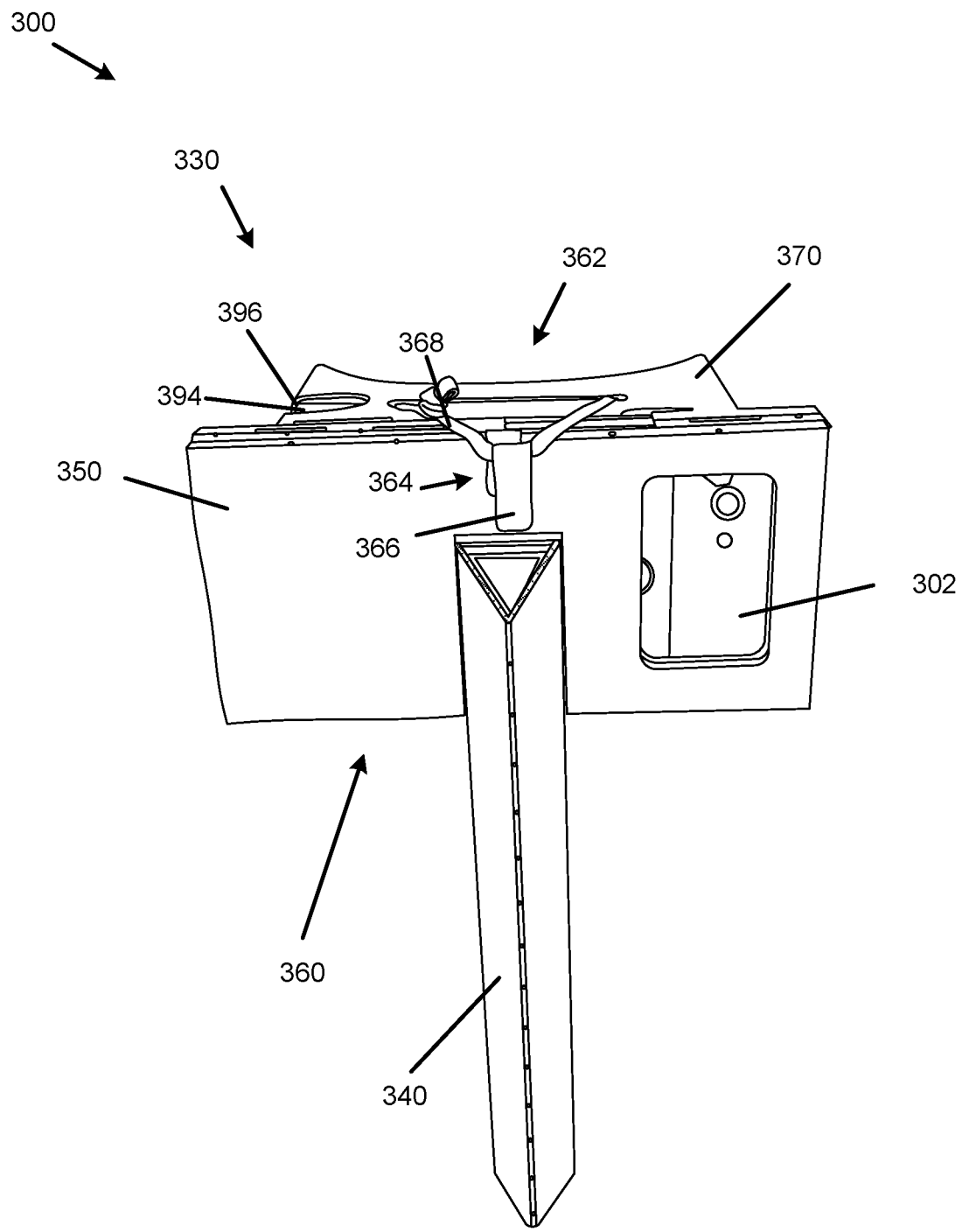
Figure 7C:
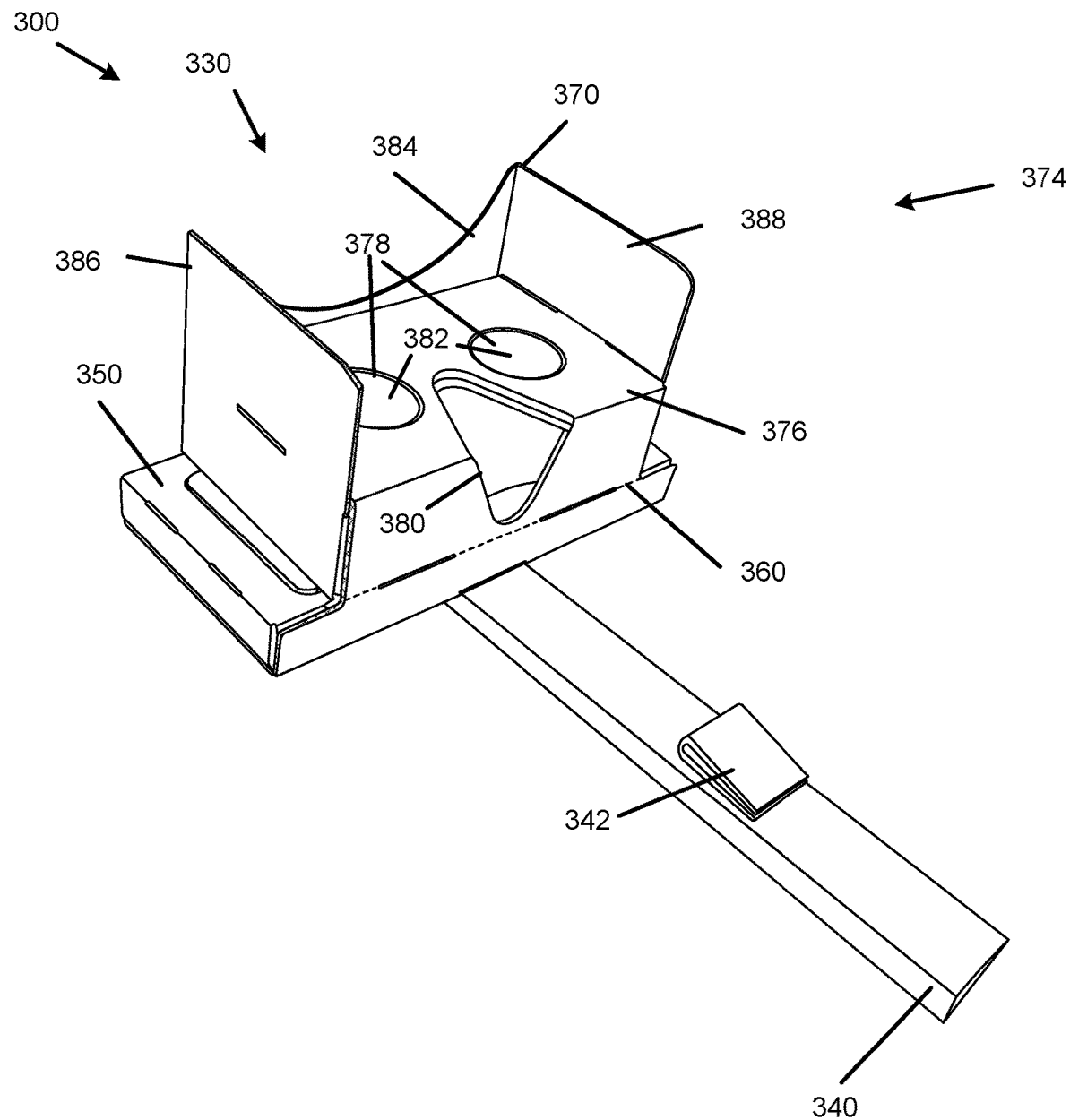

FIGS. 7A-7C are schematic diagrams of an example switchable altered reality system 300 arranged in a VR configuration. FIG. 7A shows an angled view of the switchable altered reality system 300. FIG. 7B shows a back view of the switchable altered reality system 300. FIG. 7C shows an angled side view of the switchable altered reality system 300.

The switchable altered reality system 300 may be similar to the previously described switchable altered reality system 200. For example, implementations of the switchable altered reality system 300 can switch between a virtual reality configuration and an augmented reality configuration. In the virtual reality configuration, the switchable altered reality system 300 may operate as a handheld virtual reality headset. In the augmented reality configuration, the switchable altered reality system 300 may operate as an augmented reality viewer.

In some implementations, the switchable altered reality system 300 includes a switchable viewing assembly 330 and a computing device 302. The switchable viewing assembly 330 is an example of the switchable altered reality device 130 and the computing device 302 is an example of the computing device 102.

The switchable viewing assembly 330 may be formed from one or more folded sheets of material. The switchable viewing assembly 330 may include a handle 340, a device chamber 350, a hinge 360, and a viewport assembly 370.

The handle 340 may be similar to the previously described handle 240. For example, the handle 340 may be sized to be held in the hand of a user and may have an oblong shape. The handle 340 may be formed from a rigid material, such as folded sheets of cardboard. In some implementations, the handle 340 includes a rest 342. The rest 342 may be formed from a folded sheet of material and may extend out from the handle to provide a ledge upon which other components of the switchable viewing assembly 330 may be positioned. For example, in some implementations, the rest 342 supports and provides a friction hold to position and secure the viewport assembly 370 in a lowered position when the switchable viewing assembly 330 is configured as an augmented reality viewer.

The device chamber 350 may be similar to the previously described device chamber 250. For example, the device chamber 350 may be configured to hold a computing device 302. In some implementations, the device chamber 350 includes inserts (not shown) that are specific to particular models of computing devices. Examples of the inserts are illustrated and described with respect to at least FIG. 9. Implementations may include different inserts for different models of computing devices. These inserts may fill space within the device chamber 350 so that a commonly sized device chamber can be made to securely hold various types of computing devices. The inserts may also position the computing device in a desired location and orientation within the device chamber 350.

The hinge 360 and the viewport assembly 370 may be similar to the previously described hinge 260 and viewport assembly 270 respectively. In this example, the hinge 360 is configured to allow the viewport assembly 370 to pivot with respect to the device chamber 350. For example, the viewport assembly 370 may rotate between an upright position for use in a virtual reality mode to a lowered position for use in an augmented reality mode.

The switchable viewing assembly 330 may also include a latching assembly 362 that is configured to latch the viewport assembly 370 in an upright position for use in a virtual reality mode. The latching assembly 362 may include a slot 364, a tab 366, and a cord 368. The slot 364 may be an aperture in a back panel 354 of the device chamber 350. The tab 366 may be attached to the viewport assembly 370 with the cord 368. In some configurations, the tab 366 may extend through the slot 364 to hold the viewport assembly 370 in place. The switchable viewing assembly 330 may include a releasable fastener (not shown) to secure the tab 366 to the back panel 354. In some implementations, the slot 364, the tab 366, and the cord 368 are similar to the previously describe slot 264, tab 266, and cord 268 respectively.

In some implementations, the viewport assembly 370 includes a blinder assembly 374, a front panel 376 having eye apertures 378 and a nose aperture 380, and lenses 382 disposed within the eye apertures 378. The blinder assembly 374, the front panel 376, the eye aperture 378, the nose aperture 380, and the lenses 382 may be similar to the previously described blinder assembly 274, the front panel 276, the eye aperture 278, the nose aperture 280, and the lenses 282 respectively. Like the blinder assembly 274, the blinder assembly 374 may include a upper blinder panel 384, a left blinder panel 386, and a right blinder panel 388 to block or reduce environment light from reaching a user's eyes while looking through the lenses 382 of the viewport assembly 370.

In some implementations, the viewport assembly 370 includes a trigger aperture 394 and a trigger 396. The trigger aperture may, for example, disposed on a top surface of the viewport assembly 370 (or in some implementations an upper blinder panel 384) and sized to permit a user's finger to reach through to the trigger 396. The trigger 396 may be a movable component formed from a sheet of material and configured to, when actuated, cause a hammer to contact the display of the computing device 302. For example, the hammer may be aligned to pass through the view panel 352 when the trigger is actuated. In some implementations, the contact on the display from the hammer is detected as an input on a touch sensitive display. In some implementations, the trigger 396 and the hammer are formed from an arrangement of folded pieces of material.

Figure 8A:
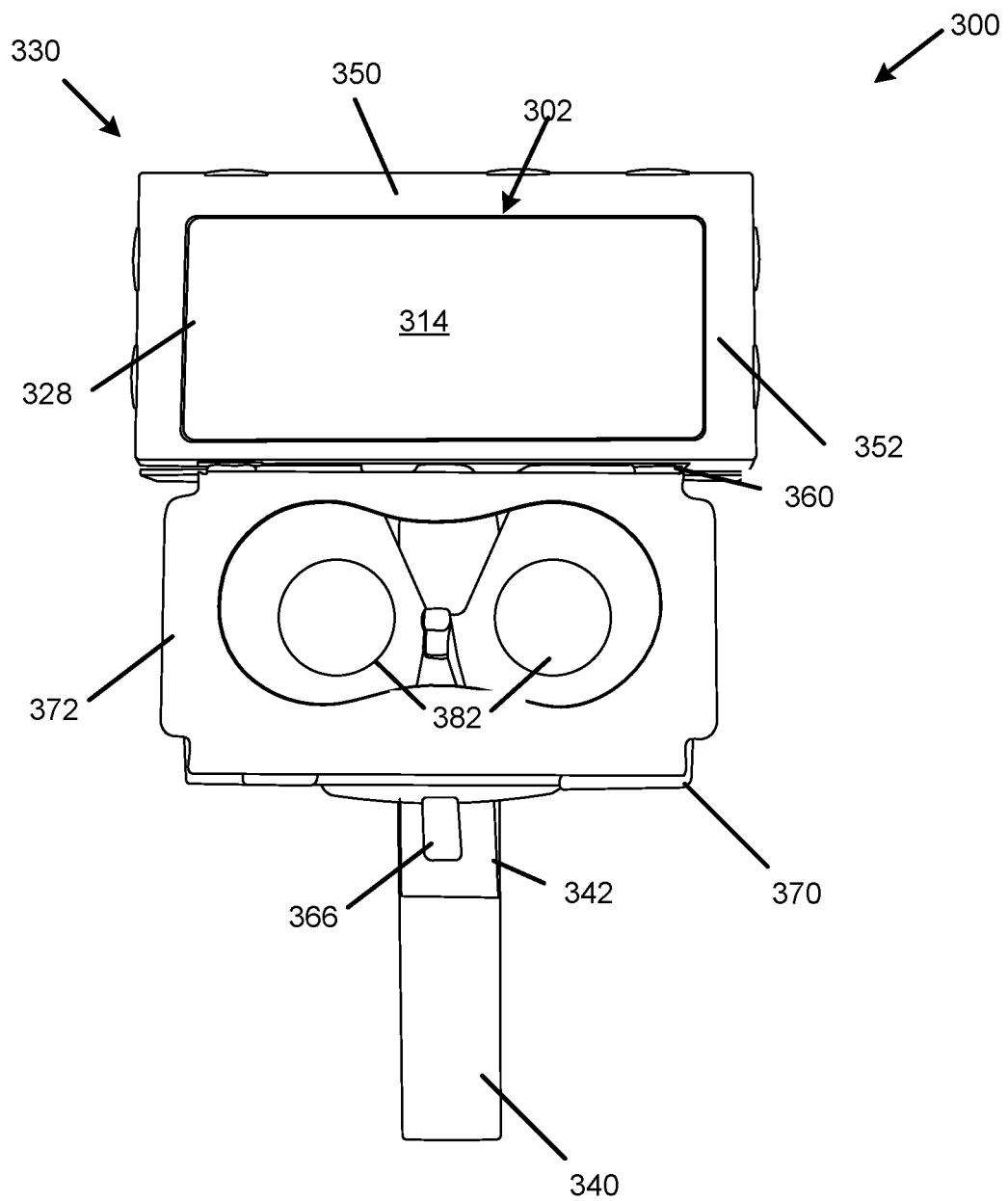
FIGS. 8A-8D are schematic diagrams of the example switchable altered reality system of FIGS. 7A-7C arranged in an AR configuration.
Figure 8B:
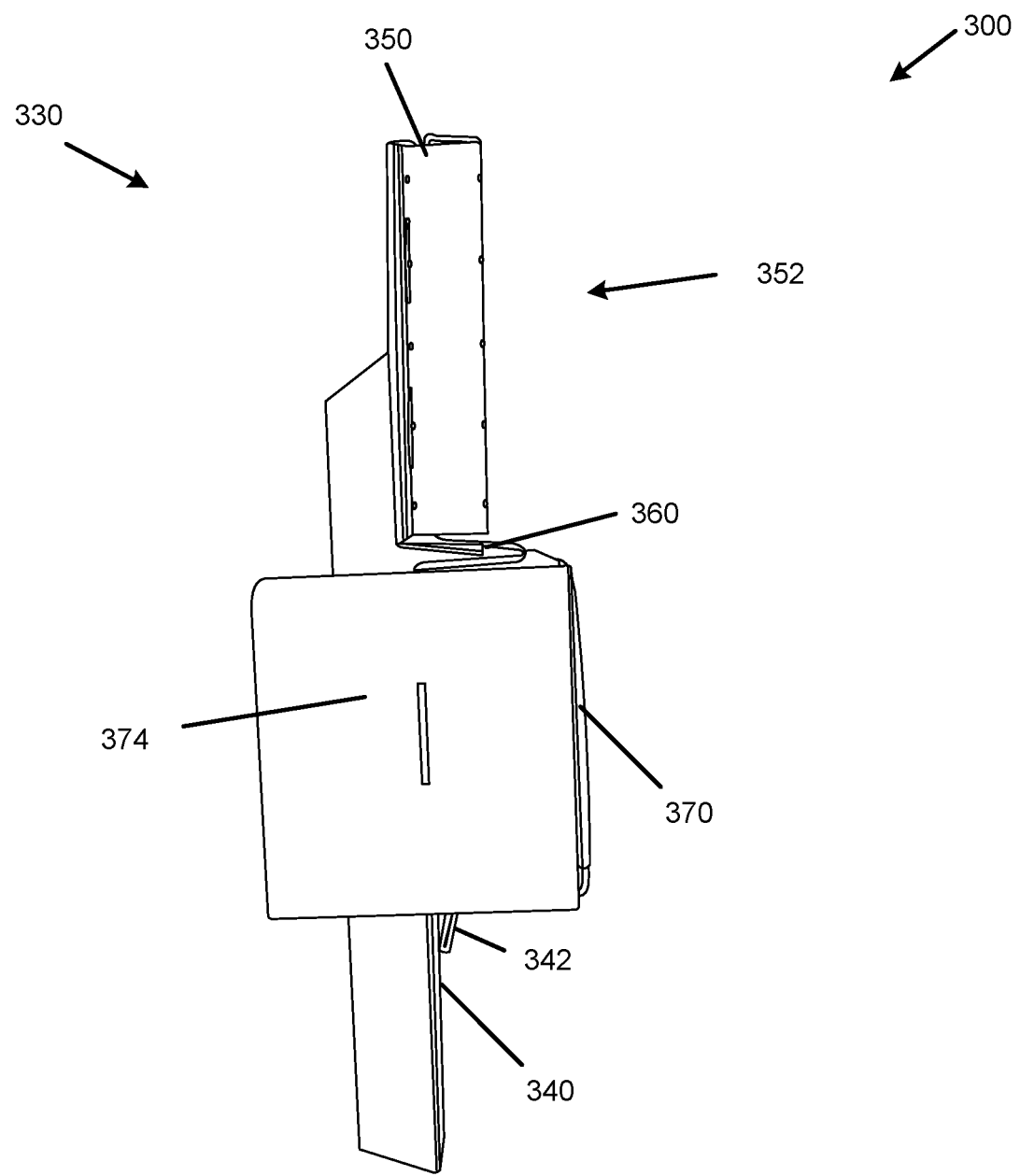
Figure 8C:
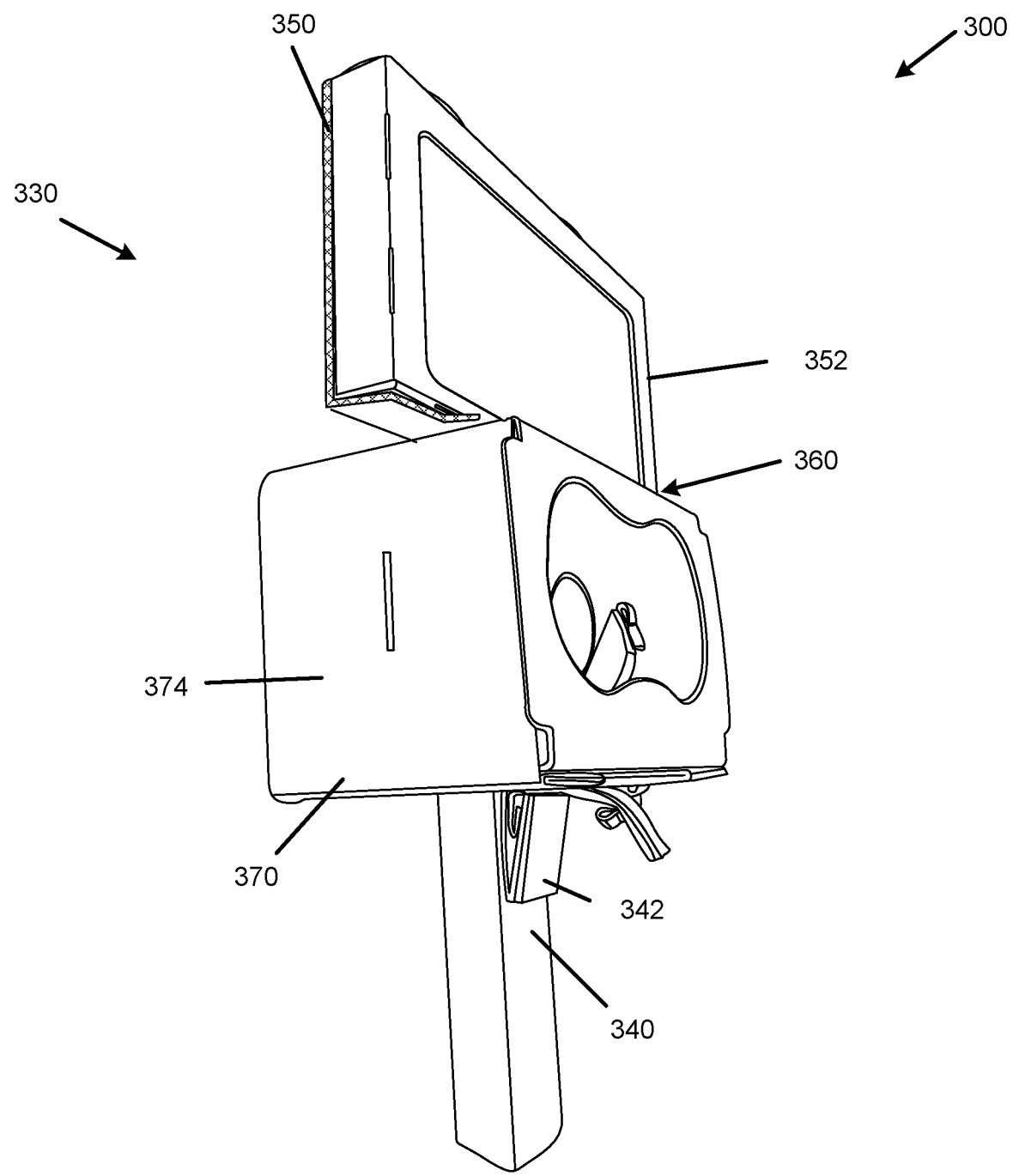
Figure 8D:
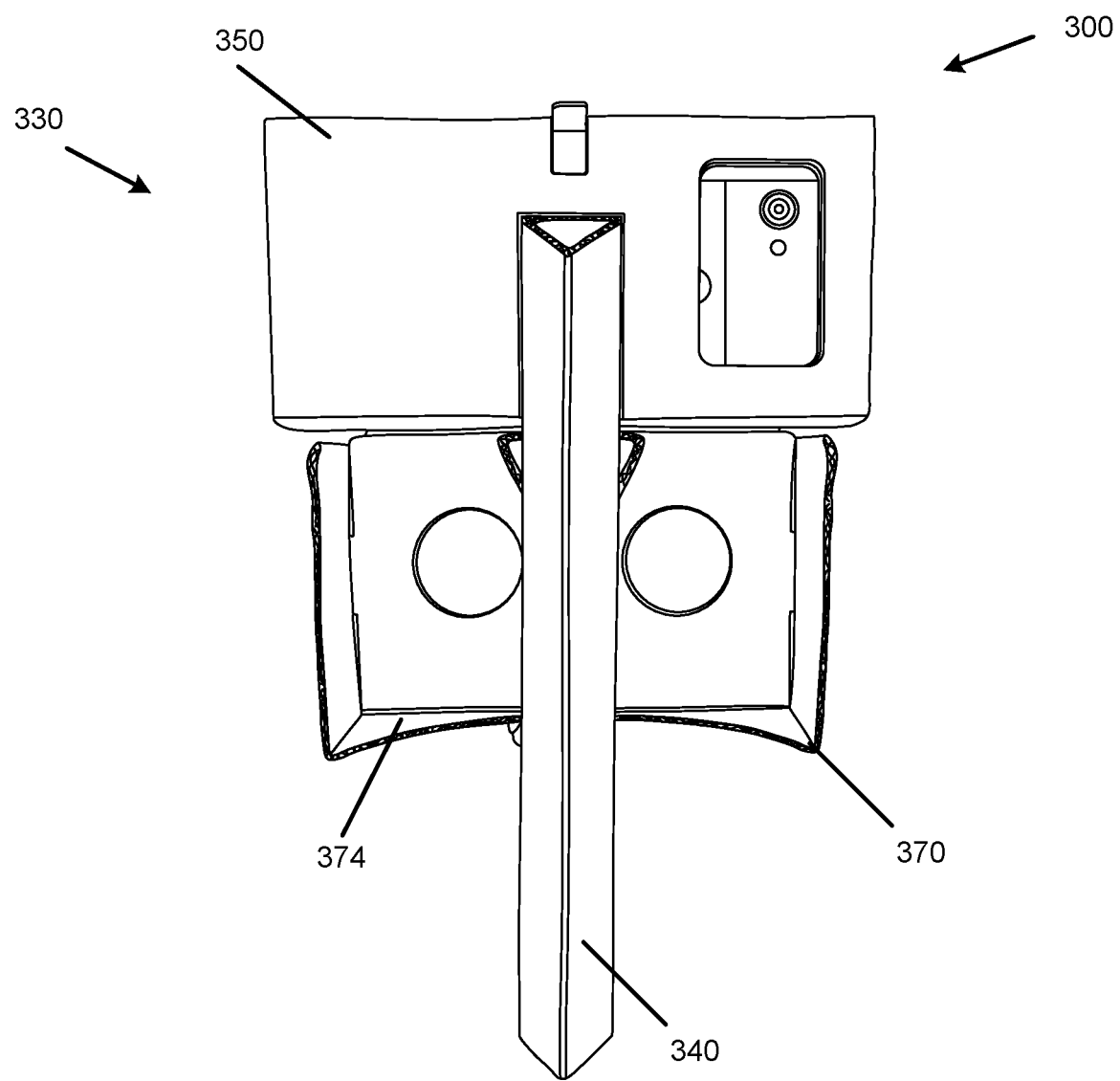

FIGS. 8A-8D are schematic diagrams of the example switchable altered reality system 300 arranged in an AR configuration. FIG. 8A shows an front view of the switchable altered reality system 300. FIG. 8B shows a side view of the switchable altered reality system 300. FIG. 8C shows an angled side view of the switchable altered reality system 300. FIG. 8D shows a back view of the switchable altered reality system 300.

As can be seen in FIG. 8A, the viewport assembly 370 is rotated into a downward position against the handle 340. The rest 342 may support and secure the viewport assembly 370 in this position. In the AR configuration, a display 314 of the computing device 302 may be visible through a view panel 352 of the device chamber 350.

In some implementations, the computing device 302 may include a proximity sensing assembly 328 that detects a proximity indicator 372 on the viewport assembly 370 (here, a tab on a side of a back surface of the viewport assembly 370). When the proximity indicator 372 is detected by the proximity sensing assembly 328, the computing device 302 may determine that the switchable viewing assembly 330 is a VR configuration. Conversely, when the proximity indicator 372 is not detected by the proximity sensing assembly 328 (e.g., because the viewport assembly 370 is rotated away from the proximity sensing assembly 328), the computing device 302 may determine that the switchable viewing assembly 330 is in an AR configuration. Based on this determination, the computing device 302 may change modes as well (e.g., from a VR mode with a stereoscopic display to an AR mode and vice versa).

Figure 9:
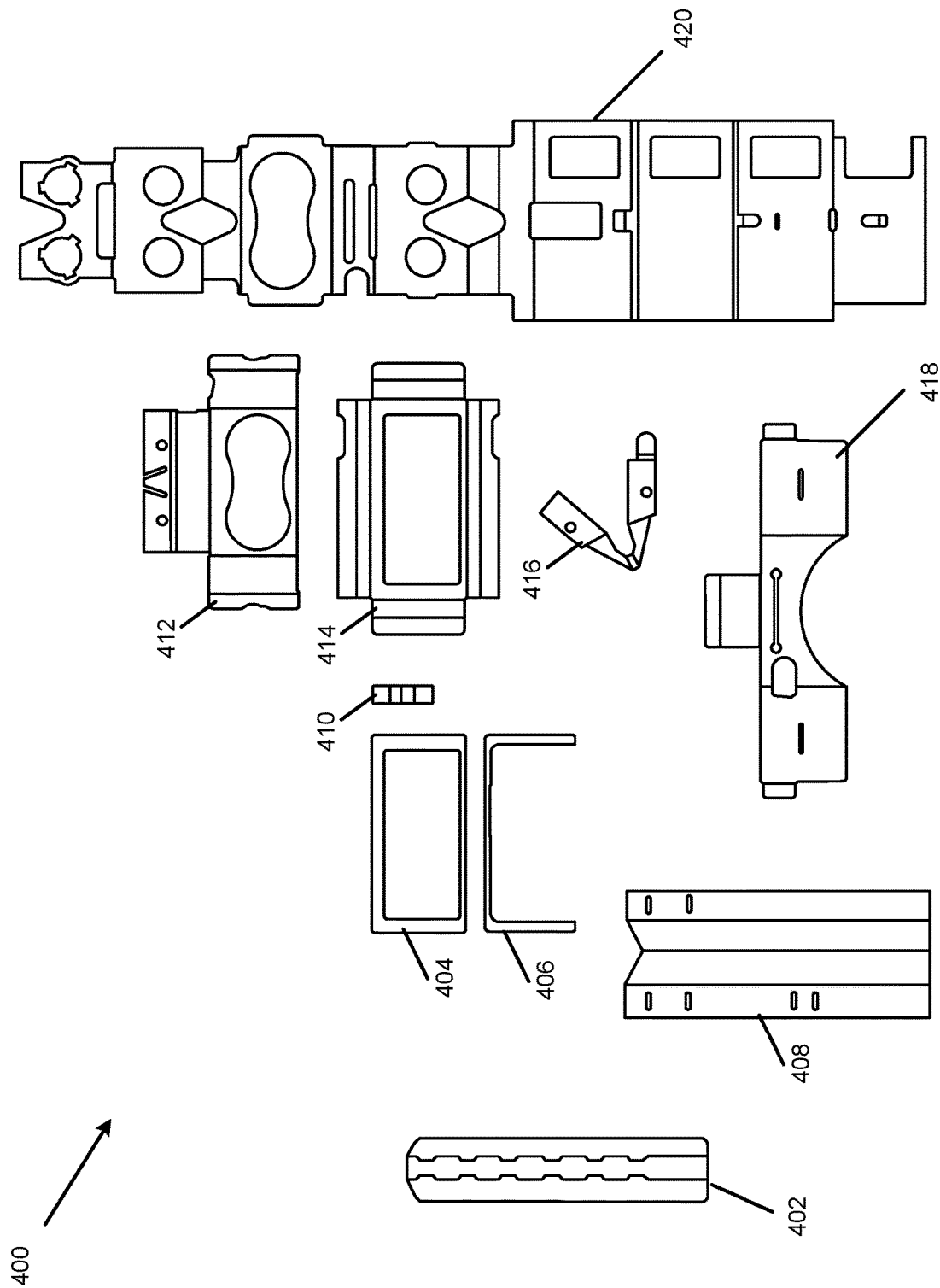
FIG. 9 is a schematic diagram of portions of an implementation of the switchable altered reality system of FIG. 2 as sheets of material.

FIG. 9 is a schematic diagram of portions of an example switchable altered reality system 400 as sheets of material. For example, FIG. 9 includes sheet portions 402, 404, 406, 408, 410, 412, 414, 416, 418, and 420. These sheet portions may be folded to form components of a switchable altered reality system 400. The components may then be coupled using various forms of fasteners or adhesives. For example, sheet portions 402 and 408 may be folded to form a handle such as the handle 340. The sheet portions 404 and 406 may be used as inserts within a device chamber such as the device chamber 350. The sheet portion 410 may be folded to form a rest on a handle that is similar to the rest 342. The sheet portions 412 and 418 may be combined with the sheet portion 420 to form a viewport assembly that is similar to the previously described viewport assembly 370. The sheet portion 414 may be combined with the sheet portion 420 to form a device chamber that is similar to the previously described device chamber 350. The sheet portion 416 may be arranged to form a hammer and trigger arrangement that, similar to the previously described arrangement of the trigger 396 and corresponding hammer.

Figure 10:
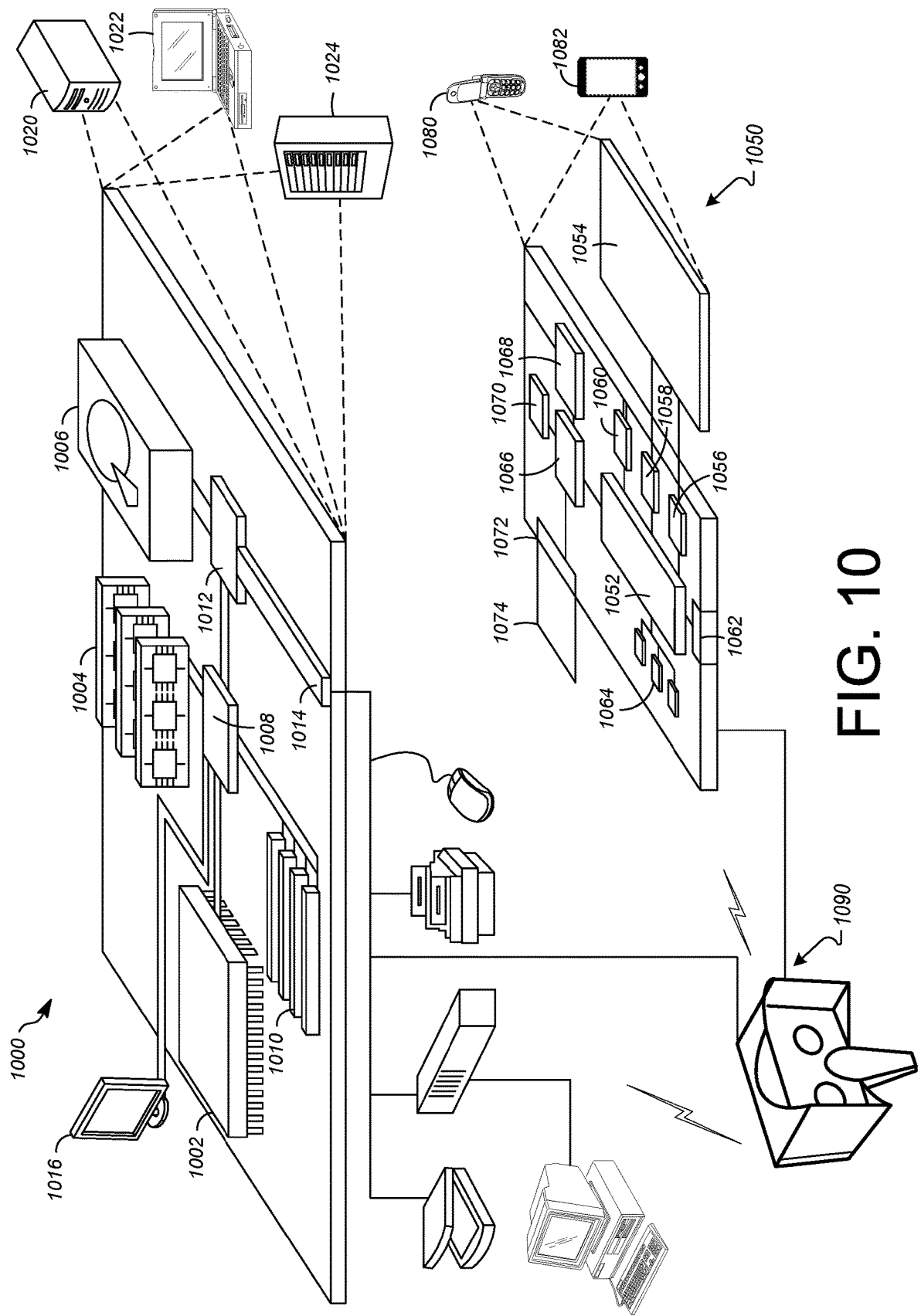
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1020 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1020, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1020. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1020 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an LCD (liquid crystal display) screen, an OLED (organic light emitting diode)) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 1 can include sensors that interface with a switchable altered reality device 1090 (i.e., VR headset/AR viewer device) to generate an AR or VR environment in an appropriate mode based on the configuration of the device 1090. For example, one or more sensors included on a computing device 1020 or other computing device depicted in FIG. 1, can provide input to device 1090 or in general, provide input to a VR/AR environment. The sensors can include, but are not limited to, a touchscreen, accelerometers, gyroscopes, pressure sensors, biometric sensors, temperature sensors, humidity sensors, and ambient light sensors. The computing device 1020 can use the sensors to determine an absolute position and/or a detected rotation of the computing device in the VR/AR environment that can then be used as input to the VR/AR environment. For example, the computing device 1020 may be incorporated into the VR/AR environment as a virtual object, such as a controller, a laser pointer, a keyboard, a weapon, etc. Positioning of the computing device/virtual object by the user when incorporated into the VR/AR environment can allow the user to position the computing device so as to view the virtual object in certain manners in the VR/AR environment. For example, if the virtual object represents a laser pointer, the user can manipulate the computing device as if it were an actual laser pointer.

The user can move the computing device left and right, up and down, in a circle, etc., and use the device in a similar fashion to using a laser pointer.

In some implementations, one or more input devices included on, or connect to, the computing device 1020 can be used as input to the VR/AR environment. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1020 when the computing device is incorporated into the VR/AR environment can cause a particular action to occur in the VR/AR environment.

In some implementations, a touchscreen of the computing device 1020 can be rendered as a touchpad in VR/AR environment. A user can interact with the touchscreen of the computing device 1020. The interactions are rendered, in device 1090 for example, as movements on the rendered touchpad in the VR/AR environment. The rendered movements can control virtual objects in the VR/AR environment.

In some implementations, one or more output devices included on the computing device 1020 can provide output and/or feedback to a user of the device 1090 in the VR/AR environment. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1020 may appear as another object in a computer-generated, 3D environment. Interactions by the user with the computing device 1020 (e.g., rotating, shaking, touching a touchscreen, swiping a finger across a touch screen) can be interpreted as interactions with the object in the VR/AR environment. In the example of the laser pointer in a VR/AR environment, the computing device 1020 appears as a virtual laser pointer in the computer-generated, 3D environment. As the user manipulates the computing device 1020, the user in the VR/AR environment sees movement of the laser pointer. The user receives feedback from interactions with the computing device 1020 in the VR/AR environment on the computing device 1020 or on the device 1090.

In some implementations, a computing device 1020 may include a touchscreen. For example, a user can interact with the touchscreen in a particular manner that can mimic what happens on the touchscreen with what happens in the VR/AR environment. For example, a user may use a pinching-type motion to zoom content displayed on the touchscreen. This pinching-type motion on the touchscreen can cause information provided in the VR/AR environment to be zoomed. In another example, the computing device may be rendered as a virtual book in a computer-generated, 3D environment. In the VR/AR environment, the pages of the book can be displayed in the VR/AR environment and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR/AR environment to control objects in the VR/AR environment.

Computing device 1000 is intended to represent various forms of digital computers and devices, including, but not limited to laptops, desktops, workstations, personal digital assistants, servers, blade servers, mainframes, and other appropriate computers. Computing device 1020 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In the following some examples are given.

EXAMPLE 1

A device comprising: a handle formed from folded sheets of material; a device chamber coupled to the handle, configured to hold a computing device, and formed from folded sheets of material; a viewport assembly formed, at least in part, from folded sheets of material; and a hinge assembly that pivotably couples the device chamber to the viewport assembly.

EXAMPLE 2

The device of example 1, wherein the hinge assembly is operable to adjust the device between a virtual reality configuration and an augmented reality configuration, a display of a computing device held in the device chamber being viewable through the viewport assembly in the virtual reality configuration and the display being viewable without the viewport assembly in an augmented reality configuration.

EXAMPLE 3

The device of any one of examples 1 to 2, wherein the hinge assembly includes a portion of a sheet of material that connects the viewport assembly and the device chamber.

EXAMPLE 4

The device of example 3, wherein the hinge assembly includes a creased region of the sheet of material.

EXAMPLE 5

The device of any one of examples 1 to 4, wherein the device chamber includes a view panel through which a display of a computing device may be viewed.

EXAMPLE 6

The device of example 5, wherein the viewport assembly includes a blinder assembly and lenses for viewing stereoscopic content in a virtual reality mode.

EXAMPLE 7

The device of example 6, wherein in the virtual reality mode, the lenses of the viewport assembly are aligned with the view panel of the device chamber.

EXAMPLE 8

The device of any one of examples 5 to 7, wherein the device chamber includes a window disposed in a surface opposite the view panel and configured to allow a camera assembly of the computing device to capture images of an environment around the device chamber.

EXAMPLE 9

The device of any one of examples 1 to 8, wherein the device chamber includes an insert that is sized to position and secure a specific type of computing device within the device chamber.

EXAMPLE 10

The device of any one of examples 1 to 9, wherein the handle includes a rest extending out from the handle in a viewing direction and configured to support and secure the viewport assembly in an augmented reality configuration.

EXAMPLE 11

The device of any one of examples 1 to 10, further comprising a latching assembly that is configured to secure the viewport assembly to the device chamber in an upright positon.

EXAMPLE 12

A system comprising: a computing device; and a switchable viewing assembly including: a handle; a device chamber coupled to the handle and configured to hold the computing device; a viewport assembly; and a hinge assembly that pivotably couples the device chamber to the viewport assembly.

EXAMPLE 13

The system of example 12, wherein the hinge assembly is operable to adjust the device between a virtual reality configuration and an augmented reality configuration, a display of the computing device being viewable through the viewport assembly in the virtual reality configuration and the display being viewable without the viewport assembly in an augmented reality configuration.

EXAMPLE 14

The system of example 12 or example 13, wherein the computing device includes a proximity sensing assembly configured to detect a proximity indicator of the viewport assembly.

EXAMPLE 15

The system of example 14, wherein the computing device is configured to switch from an augmented reality mode to a virtual reality mode based on the proximity sensing assembly detecting the proximity indicator.

EXAMPLE 16

The system of example 15, wherein in the virtual reality mode, the computing device causes a display to display stereoscopic content.

EXAMPLE 17

The system of example 15 or example 16, wherein the computing device includes a camera assembly and wherein in the augmented reality mode, the computing device causes the display to display images captured with the camera assembly.

EXAMPLE 18

A device comprising: a handle formed from folded sheets of material; a device chamber coupled to the handle, formed from folded sheets of material; a viewport assembly formed at least in part from folded sheets of material; and a hinge assembly that pivotably couples the device chamber to the viewport assembly and is operable to adjust the device between a virtual reality configuration and an augmented reality configuration, a display of a computing device held in the device chamber being viewable through the viewport assembly in the virtual reality configuration and the display being viewable without the viewport assembly in an augmented reality configuration.

EXAMPLE 19

The device of example 18, wherein the viewport assembly includes a trigger and hammer arrangement that is configured to cause the hammer to contact a display of computing device contained in the device chamber in response to the trigger being actuated.

EXAMPLE 20

The device of example 19, wherein the trigger and hammer arrangement is formed from a folded piece of material.

What is claimed is:
1. A device comprising:
   a handle formed from folded sheets of material;
   a device chamber coupled to the handle, configured to hold a computing device via a view panel, and formed from folded sheets of material;

a viewport assembly formed, at least in part, from folded sheets of material; and a hinge assembly that pivotably couples the device chamber to the viewport assembly, the device configured to be moved between a virtual reality configuration and an augmented reality configuration via the hinge assembly, the view panel of the device chamber being disposed between the computing device and the viewport assembly when the device is in the virtual reality configuration.

2. The device of claim 1, wherein the hinge assembly is operable to adjust the device between a virtual reality configuration and an augmented reality configuration, a display of a computing device held in the device chamber being viewable through the viewport assembly in the virtual reality configuration and the display being viewable without the viewport assembly in an augmented reality configuration.

3. The device of claim 1, wherein the hinge assembly includes a portion of a sheet of material that connects the viewport assembly and the device chamber.

4. The device of claim 3, wherein the hinge assembly includes a creased region of the sheet of material.

5. The device of claim 1, wherein the viewport assembly includes a blinder assembly and lenses for viewing stereoscopic content in a virtual reality mode.

6. The device of claim 1, wherein the viewport assembly includes lenses,
in a virtual reality mode, the lenses of the viewport assembly are aligned with the view panel of the device chamber such that the view panel is disposed between the computing device and the lenses of the viewport assembly.

7. The device of claim 1, wherein the device chamber includes a window disposed in a surface opposite the view panel and configured to allow a camera assembly of the computing device to capture images of an environment around the device chamber.

8. The device of claim 1, wherein the device chamber includes an insert that is sized to position and secure a specific type of computing device within the device chamber.

9. The device of claim 1, wherein the handle includes a rest extending out from the handle in a viewing direction and configured to support and secure the viewport assembly in an augmented reality configuration.

10. The device of claim 1, further comprising a latching assembly that is configured to secure the viewport assembly to the device chamber in an upright position.

11. A system comprising:
a switchable viewing assembly including:
a handle;
a device chamber coupled to the handle and configured to hold a computing device;
a viewport assembly; and
a hinge assembly that pivotably couples the device chamber to the viewport assembly, the switchable viewing assembly configured to be moved between a virtual reality configuration and an augmented reality configuration via the hinge assembly, the viewport assembly configured to be rotated away from the device chamber and toward the handle when the switchable viewing assembly is moved to the augmented reality configuration.

12. The system of claim 11, wherein the computing device has a display viewable through the viewport assembly in the virtual reality configuration, and the display is viewable without the viewport assembly in the augmented reality configuration.

13. The system of claim 11, wherein the computing device includes a proximity sensing assembly configured to detect a proximity indicator of the viewport assembly.

14. The system of claim 13, wherein the computing device is configured to switch from the augmented reality configuration to the virtual reality configuration based on the proximity sensing assembly detecting the proximity indicator.

15. The system of claim 11, wherein in the virtual reality mode, the computing device causes a display to display stereoscopic content.

16. The system of claim 11, wherein the computing device includes a camera assembly,
in the augmented reality configuration, the computing device causes a display to display images captured with the camera assembly.

17. A device comprising:
a handle;
a device chamber coupled to the handle; and
a viewport assembly including lenses;
the device chamber being hingedly coupled to the viewport assembly, the device being configured to move between a virtual reality configuration and an augmented reality configuration, the device chamber configured to hold a computing device having a display viewable through the viewport assembly in the virtual reality configuration, the display being viewable through the viewport assembly in an augmented reality configuration, the viewport assembly being rotated away from the device chamber when moved to the augmented reality configuration.

18. The device of claim 17, wherein the viewport assembly includes a trigger and hammer arrangement that is configured to cause the hammer to contact a display of computing device contained in the device chamber in response to the trigger being actuated.

19. The device of claim 18, wherein the trigger and hammer arrangement is formed from a folded piece of material.

20. A device comprising:
a handle;
a device chamber coupled to the handle, and configured to hold a computing device; and
a viewport assembly hingedly coupled to the device chamber, the handle including a rest extending out from the handle in a viewing direction and confiugured to support and secure the viewport assembly in an augmented reality configuration.

21. a device comprising:
a handle;
a device chamber coupled to the handle, and configured to hold a computing device; and
a viewport assembly hingedly coupled to the device chamber, the device configured to be moved between a virtual reality configuration and an augmented reality configuration via the hinged coupling, the computing device including a proximity sensing assembly configured to detect a proximity indicator of the vidwport assembly.

* * * * *

UNITED STATES PATENT AND TRADEMARK OFFICE
CERTIFICATE OF CORRECTION

PATENT NO. : 10,750,162 B2  
APPLICATION NO. : 16/128264  
DATED : August 18, 2020  
INVENTOR(S) : Goossens et al.

Page 1 of 1

It is certified that error appears in the above-identified patent and that said Letters Patent is hereby corrected as shown below:

In the Claims

In Column 22, Claim 17, Line 32, delete "through" and insert -- without --, therefor.

In Column 22, Claim 20, Line 50, delete "confiugured" and insert -- configured --, therefor.

In Column 22, Claim 21, Line 62, delete "videwport" and insert -- viewport --, therefor.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*